(12) United States Patent
Abrams

(10) Patent No.: US 8,800,586 B2
(45) Date of Patent: Aug. 12, 2014

(54) FLUID CONDUIT SAFETY SYSTEM WITH SEPARABLE COUPLING

(75) Inventor: Joseph H. Abrams, Wynnewood, PA (US)

(73) Assignee: Zena Associates, LLC, Folcroft, PA (US)

( * ) Notice: Subject to any disclaimer, the term of this patent is extended or adjusted under 35 U.S.C. 154(b) by 1010 days.

(21) Appl. No.: 12/560,758

(22) Filed: Sep. 16, 2009
(Under 37 CFR 1.47)

(65) Prior Publication Data

US 2010/0276008 A1 Nov. 4, 2010

Related U.S. Application Data

(63) Continuation of application No. 12/361,813, filed on Jan. 29, 2009, now abandoned.

(51) Int. Cl.
*F16K 17/14* (2006.01)
(52) U.S. Cl.
USPC .................................. 137/68.14; 137/614.04
(58) Field of Classification Search
CPC ............................ F16L 55/1007; B67D 7/3218
USPC ...................... 137/67–68.17, 614.04; 285/117
See application file for complete search history.

(56) References Cited

U.S. PATENT DOCUMENTS

| | | |
|---|---|---|
| 1,304,364 A | 5/1919 | Phillips et al. |
| 2,054,561 A | 9/1936 | Greenberg |
| 2,165,640 A | 7/1939 | Marx |
| 3,273,578 A | 9/1966 | Clark |
| 3,542,047 A * | 11/1970 | Lowell ................... 137/68.15 |
| 3,630,214 A | 12/1971 | Levering |
| 3,802,456 A | 4/1974 | Wittgenstein |
| 3,859,692 A | 1/1975 | Waterman |
| 3,907,336 A | 9/1975 | Siegmund |
| 3,913,603 A | 10/1975 | Torres |
| 4,023,584 A | 5/1977 | Rogers et al. |
| 4,098,438 A | 7/1978 | Taylor |
| 4,351,351 A | 9/1982 | Flory et al. |
| 4,509,558 A | 4/1985 | Slater |
| 4,735,083 A | 4/1988 | Tenenbaum |
| 4,827,977 A | 5/1989 | Fink, Jr. |
| 4,886,087 A | 12/1989 | Kitchen |
| 4,896,688 A * | 1/1990 | Richards et al. ........... 137/68.15 |
| 5,054,523 A | 10/1991 | Rink |
| 5,099,870 A | 3/1992 | Moore et al. |
| 5,172,730 A | 12/1992 | Driver |
| 5,343,738 A | 9/1994 | Skaggs |

(Continued)

OTHER PUBLICATIONS

Website for HPF, Inc., Breakaway Couplings, www.hpflap.com, HPF, Inc., 13450 Indian Creek, Cleveland, Ohio 44130, Tel: 440-816-2195, 1-800-445-1289, Fax: 440-816-2196, 2 pages, Copyright 2006.

(Continued)

*Primary Examiner* — Kevin Lee
*Assistant Examiner* — Phyllis Nichols
(74) *Attorney, Agent, or Firm* — Barley Snyder

(57) ABSTRACT

The present invention relates to safety mechanisms for high-pressure fluid delivery systems. Particularly, the invention relates to a breakaway device which prevents uncontrolled "whipping" of the conduit ends upon a rupture. A heat dissipating coupling, permitting operation of the conduit system at desired temperatures, is also included, as is a breakaway device provided with such a heat dissipation feature.

21 Claims, 18 Drawing Sheets

(56) References Cited

U.S. PATENT DOCUMENTS

| | | |
|---|---|---|
| 5,357,998 A | 10/1994 | Abrams |
| 5,427,155 A | 6/1995 | Williams |
| 5,497,809 A | 3/1996 | Wolf |
| 5,518,034 A | 5/1996 | Ragout et al. |
| 5,531,357 A | 7/1996 | Guilmette |
| 5,551,484 A | 9/1996 | Charboneau |
| 5,654,499 A | 8/1997 | Manuli |
| 5,714,681 A | 2/1998 | Furness et al. |
| 5,803,127 A | 9/1998 | Rains |
| 5,868,170 A | 2/1999 | Spengler |
| 5,931,184 A | 8/1999 | Armenia et al. |
| 6,260,569 B1 | 7/2001 | Abrams |
| 6,546,947 B2 | 4/2003 | Abrams |
| 6,843,506 B2 * | 1/2005 | Osborne .......................... 285/1 |

OTHER PUBLICATIONS

Website, CSE IPG, Safety Breakaway Coupling, www.cse-ipg.com, 2 pages, Copyright 2000-2010.

* cited by examiner

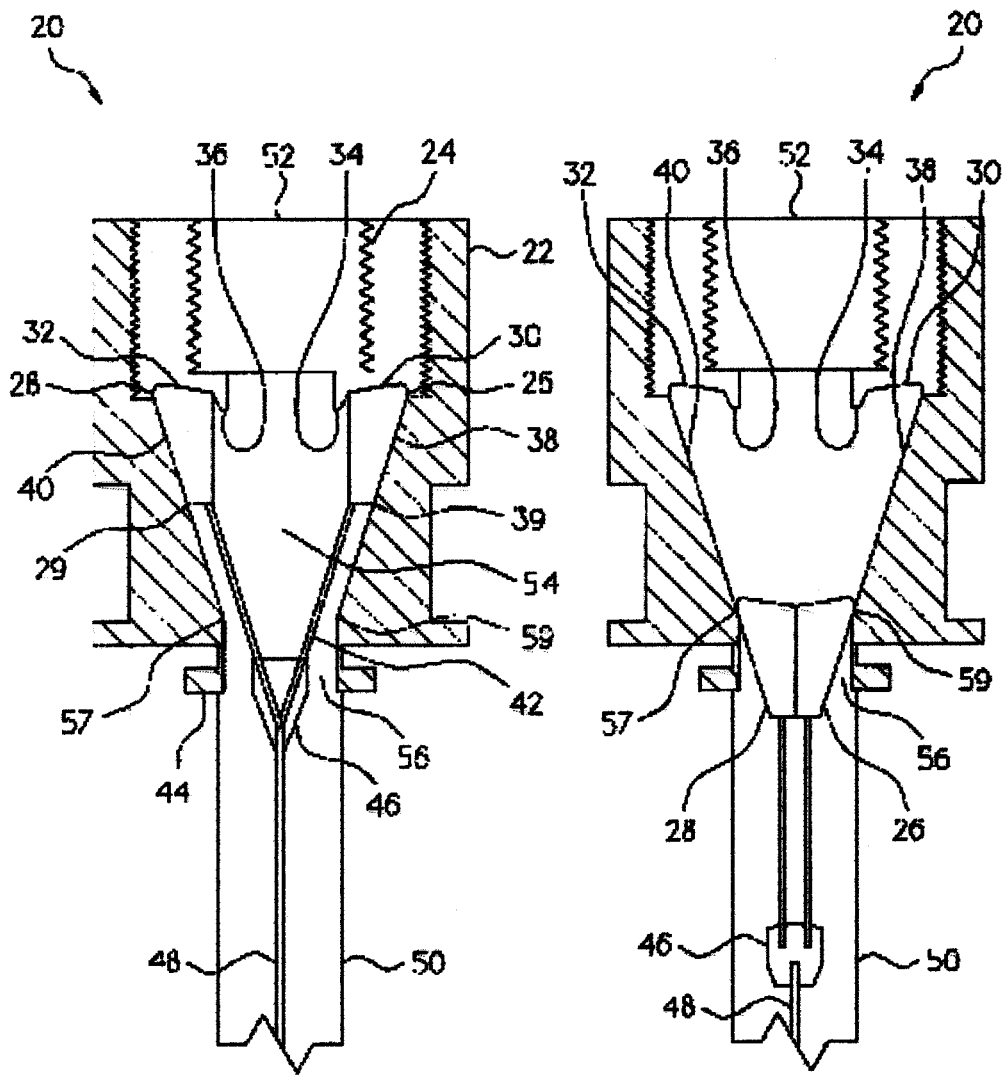

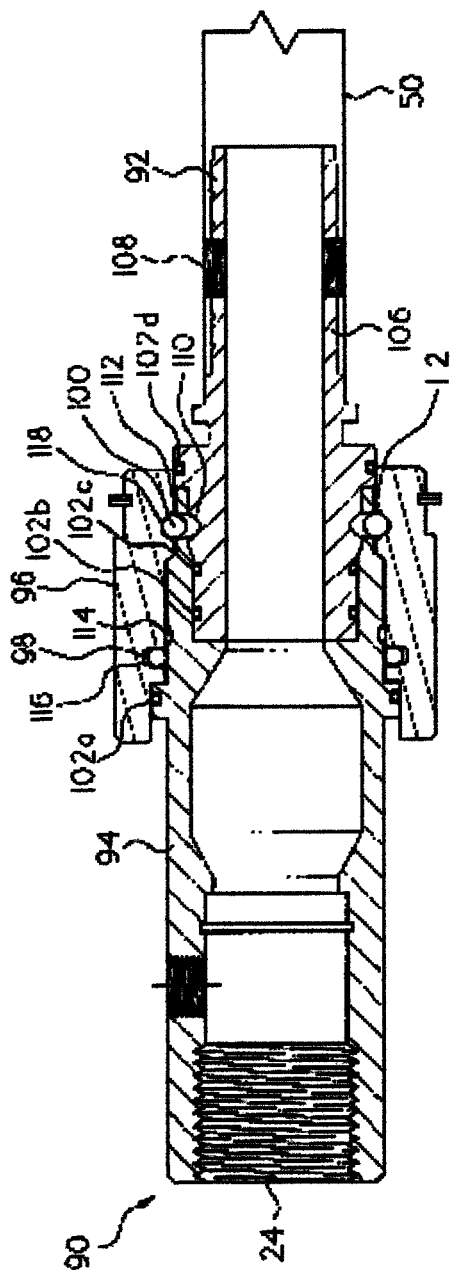
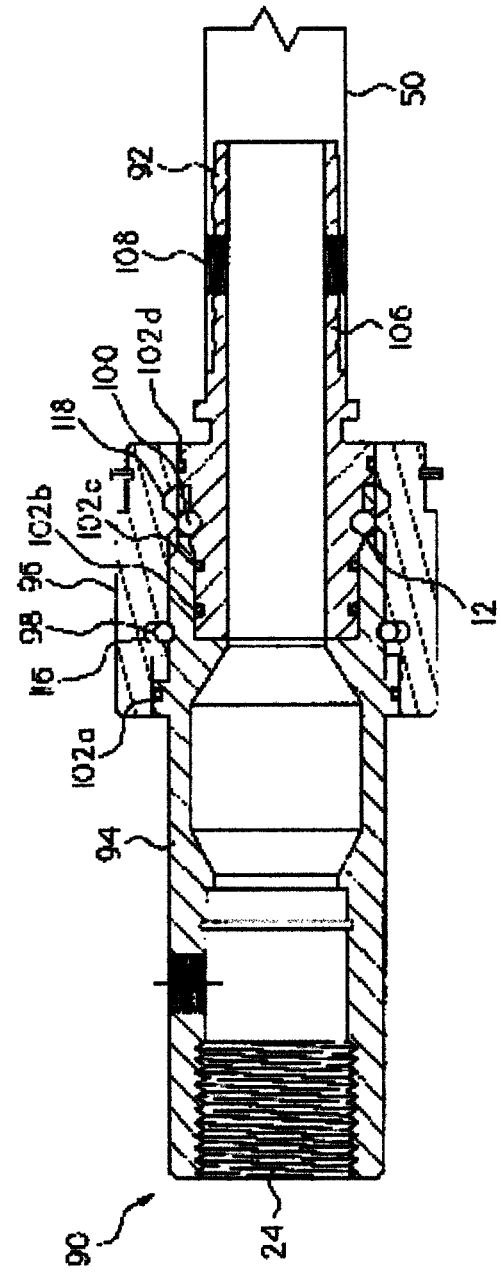

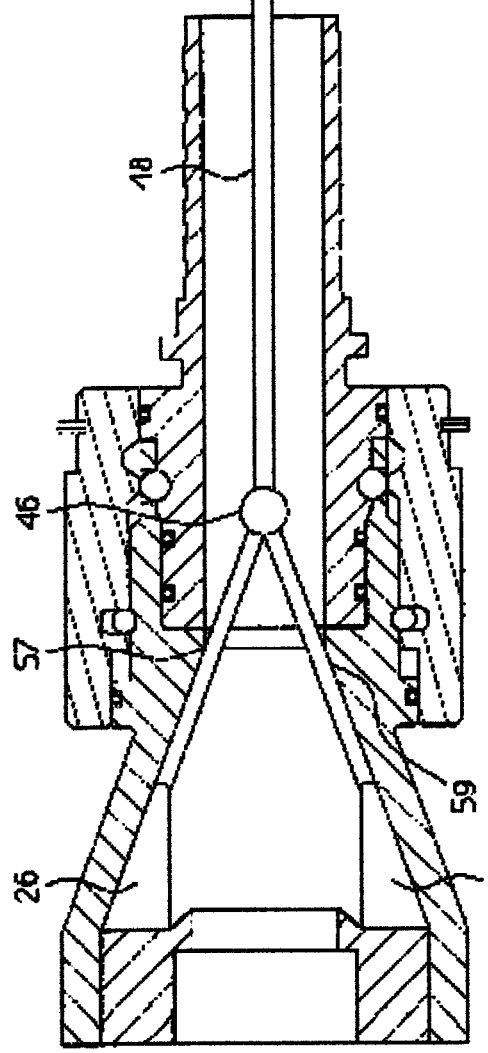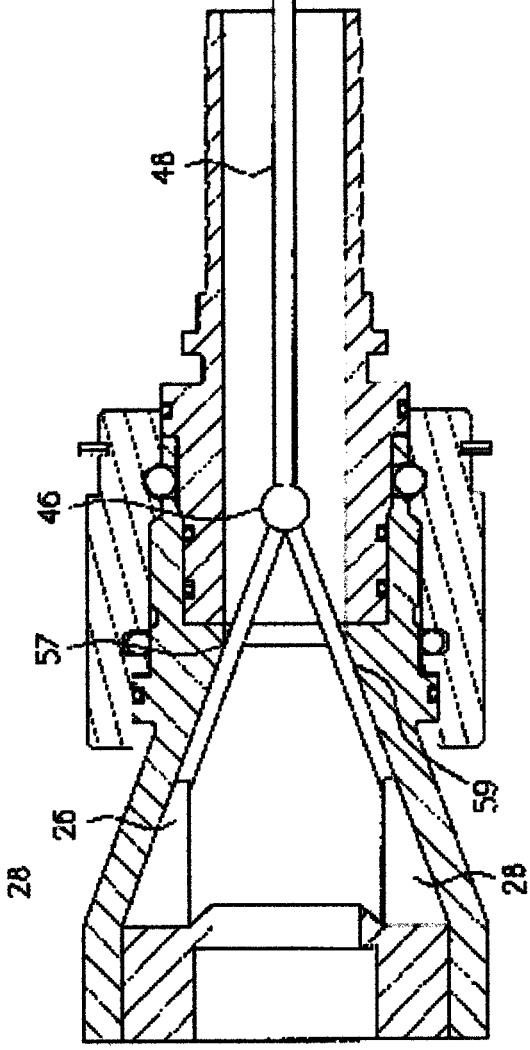

FLUID CONDUIT SAFETY SYSTEM WITH SEPARABLE COUPLING

CROSS-REFERENCE TO RELATED APPLICATIONS

This application is a continuation of application Ser. No. 12/361,813 filed on Jan. 29, 2009 now abandoned.

FIELD OF THE INVENTION

The present invention relates to safety mechanisms for high-pressure fluid conduit delivery systems. Particularly, the invention relates to a breakaway safety coupling which quickly halts the flow of fluid through the conduit. The invention also relates to a leash system which prevents uncontrolled "whipping" of the conduit ends upon a rupture at the breakaway coupling. The breakaway coupling may also be provided with a heat dissipation feature, permitting operation of the conduit system at desired temperatures.

BACKGROUND OF THE INVENTION

As described in U.S. Pat. Nos. 5,357,998, 6,260,569, and 6,546,947, which are incorporated by reference herein, there is a risk of conduit failure when working with fluids traveling through fluid conduits. Conduit failure can occur in high-pressure and low pressure situations.

When filling containers (which includes, but is not limited to, cylinders, tank trucks, rail cars, and stationary tanks) with compressed or non-compressed gasses or fluids, or operating equipment that relies on pressurized fluid flow or compressed gas, it is necessary for the fluid/gas to be transferred from one container to another. Although the fluid/gas can be transferred from one container to another using solid piping, it is common in many situations to use a flexible conduit or hose attached between the containers. A flexible hose allows ease of connection/disconnection of containers, as well as a limited range of motion between source and destination.

For example, compressed or non-compressed fluid/gas, such as oxygen, nitrogen, carbon dioxide and chemicals, such as petroleum and acids are transported, stored and used in individual containers of varying size and capacity. In order to fill these containers with the desired product, it is necessary to connect each container to a filling connection (either singly or in groups) at the location of a gas filler/seller. In order to connect each container to the filling connection, a flexible hose is used to allow for quick connection/disconnection of the containers to the filling connection. A filling station manifold is one example of a filling connection. In addition, operating equipment that runs or uses compressed gas (such as forklifts) or pressurized fluids (such as hydraulic systems) also benefit from the ease of use of flexible hose.

Hoses can fail, however, even though they are generally made from durable yet flexible materials/constructions, such as treated and reinforced rubber, neoprene, nylon, TEFLON™, stainless steel and others. Hose failures can occur from a number of causes, including ruptures, deteriorations and splits/cuts. When a hose fails, it can cause substantial damage in a number of ways. First, if a hose is completely severed or split, both ends of the hose can whip around wildly under the forces of the compressed gas or fluid, now exerted from the delivery end and the receiving end. In addition, if a container is not secured, the pressure of the gas or fluid leaving the container can cause the container to move very rapidly in the opposite direction of the gas/fluid. Both of these situations can result in substantial risk of personal injury, as well as property damage. Still further, a hose failure will cause a leak from both the delivery and receiving ends, leading to a costly waste of gas or fluid, the discharge of hazardous gas or fluids, as well as the by potential of filling the environment with hazardous fumes.

U.S. Pat. No. 5,357,998 discloses a successful fluid conduit safety system that uses a flexible, yet relatively stiff cable disposed inside of a hose to maintain single valve bodies at either end of the hose in an open position during normal or open operation. When a failure condition, such as a rupture, cut, separation or stretch of the hose occurs, the valve bodies are able to seat with the valve seats, sealing both ends of the hose. This prevents fluid/gas leaks from both sources (i.e. container and filling apparatus). When a failure occurs, the flexible, yet relatively stiff cable may be severed, allowing the fluid pressure to force the valve bodies into engagement with the valve seats. If a hose failure does not sever the cable, the valve seats are either forced into engagement with the valve bodies or the valve bodies are forced into engagement with the valve seats. In either circumstance, a seal is accomplished by seating the valve bodies with the valve, seats. U.S. Pat. Nos. 6,260,569 and 6,546,947 disclose additional improvements in such a fluid conduit system.

Thus, when a hose suffers a failure condition, these systems prevent excessive spillage by stopping the flow of fluid via the seating of the valve bodies with the valve seats. However, particularly under higher pressure applications, a failure condition involving complete severing of the hose may cause the ends thereof to "whip" uncontrollably during the brief time between the failure condition and the interruption of flow. The whipping ends of hose present a hazard to anyone present in the area.

Flow through such conduit systems, particularly higher pressure applications through smaller gauge hoses (e.g., half inch or three quarter inch) also tends to generate a large amount of heat, which itself may cause, in part or in whole, a failure condition.

The art is in need of improved safety conduit systems which allow for dissipation of heat, and which prevent uncontrolled whipping of the ends of the conduit upon a failure condition.

SUMMARY OF THE INVENTION

The present invention provides solutions to several problems found in high pressure fluid conduit systems, including a breakaway coupling capable of halting the flow of fluid upon a rupture at the breakaway, a leash system to prevent uncontrolled whipping upon such a rupture, and a heat dissipation feature, any or all of which provide safer operation of fluid conduit systems than available at present. In one aspect, the invention provides a separable coupling at one or both of the hose ends, as shown in FIG. 21. The breakaway bolts are selected such that the force required to break the breakaway bolts is less than the force required to sever the hose or cable in a conduit system such as that described above. A stress upon the hose reaching the predetermined breakaway point shears the breakaway bolts, activating the valve closing mechanism which stops the flow and relieves the stress on the hose, and thereby prevents severing of the hose or internal cable. In order to prevent whipping, the two sides of the separable coupling are connected by a second, extendible, means (i.e., a connection other than the breakaway bolts) which acts as a leash keeping the two sides in dose proximity to each other. Thus, upon the breaking of the breakaway bolts, the two sides of the separable coupling separate but remain joined via the extendible leash, thereby preventing the otherwise loose end of the hose from whipping in an uncontrolled and dangerous fashion. While one end of the second, extendible means is connected to the hose side of the coupling, the other end may either be connected to the manifold side of the coupling, or may be connected directly to the manifold itself.

In one aspect, the present invention includes a safety system for a fluid conduit comprising a fluid conduit having first and second ends, first and second housings attached to said fluid conduit at the respective first and second ends, a first valve seat disposed in the first housing and a second valve seat disposed in the second housing. The first and second valve seats are positioned a first predetermined distance from each other. A first valve body is disposed in the first housing at the first end of the conduit and a second valve body is disposed in the second housing at the second end of the conduit. The first and second valve seats are disposed between the first and second valve bodies, with the first and second valve bodies positioned a second predetermined distance from the first and second valve seats, respectively. A valve control means retains the first and second valve bodies the second predetermined distance from the first and second valve seats, respectively, during an open flow condition, and seats one or both of the first and second plurality of valve bodies with the first and second valve seats, respectively, during a conduit failure. In this aspect, at least one of the first or second housings comprises a separable coupling, the two sides of which are joined by breakaway bolts and optionally an extensible leash.

In another aspect, one or both of the end housings, whether or not comprising separable couplings, is provided with a heat dissipation feature crafted from a suitable material, in the form of a plurality of fins as shown in FIG. 22, to dissipate excess heat of compression and maintain the fluid conduit system within desirable operating temperatures.

The invention disclosed herein therefore provides, in one aspect, a separable coupling for a fluid conduit system, comprising:

a proximal side comprising a first rigid toroidal member having a first central hole, the toroidal member having a plurality of breakaway bolt holes, and the first toroidal member further comprising a longitudinal extension concentric therewith capable of attachment to a fluid conduit;

a distal side comprising a second rigid toroidal member having a second central hole, the second toroidal member having a plurality of breakaway bolt holes, and the second toroidal member further comprising a longitudinal manifold extension concentric therewith capable of attachment to a fluid manifold on a fluid receptacle;

breakaway bolts which pass through and secure the proximal and distal sides to each other;

a leash tethered to the proximal and distal sides; and a valve safety system positioned within the distal side;

wherein upon breakage of the breakaway bolts, the valve safety system shuts and ceases the flow of fluid through the coupling.

In another aspect, the invention provides a safety system for a fluid conduit comprising a fluid conduit having first and second ends;

a first housing connected to said first end of said fluid conduit, said first housing having first and second openings and an internal cavity, therebetween and a first connection point inside said internal cavity, a second housing connected to said second end of said fluid conduit, said second housing having first and second openings and an internal cavity, therebetween and a second connection point inside said internal cavity;

a first valve seat disposed in said first housing and a second valve seat disposed in said second housing, said first and second valve seats positioned a fiat predetermined distance from each other;

a first valve body pivotally attached to said first housing at said first connection point and a second valve body pivotally attached to said second housing at said second connection point, said first and second valve seats disposed between said first and second plurality of valve bodies and said internal cavity of said first housing, further comprises a first recess for retaining said first valve body during an open flow condition substantially out of the flow path of said fluid; and valve control means for retaining said first and second valve bodies from said first and second valve seats, respectively, during an open fluid flow condition, and pivotally seating one or more of said first and second valve bodies with said first and second valve seats, respectively, during a fluid conduit failure;

wherein said first or second housing is a separable coupling according to claim 1.

The valve control means may comprise a pressurized tube which may be attached to the first and second valve bodies. The hose and pressurized tube may each have substantially the same length.

In another aspect, the invention provides a safety system for a fluid conduit comprising:

a fluid conduit having first and second ends;

a first housing connected to said first end of said fluid conduit, said first housing having first and second openings and an internal cavity, therebetween and a first connection point inside said internal cavity;

a second housing connected to said second end of said fluid conduit, said second housing having first and second openings and an internal cavity, therebetween and a second connection point inside said internal cavity;

a first valve seat disposed in said first housing and a second valve seat disposed in said second housing, said first and second valve seats positioned a first predetermined distance from each other;

a first valve body pivotally attached to said first housing at said first connection point said first valve body comprised of a main body having first and second extensions therefrom, said first extension pivotally attached to said connection point and said second extension attached to said retaining means and a sealable surface for sealably engaging said first valve seat when said first valve body seats with said first valve seat, a second valve body pivotally attached to said second housing at said second connection point, said first and second valve seats disposed between said first and second plurality of valve bodies; and valve control means for retaining said first and second valve bodies from said first and second valve seats, respectively, during an open fluid flow condition, and pivotally seating one or more of said first and second valve bodies with said first and second valve seats, respectively, during a fluid conduit failure;

wherein said first or second housing is a separable coupling according to claim 1.

7. A safety system for a fluid conduit comprising:

a fluid conduit having first and second ends;

a first housing connected to said first end of said fluid conduit, said first housing having first and second openings and an internal cavity, therebetween and a first connection point inside said internal cavity;

a second housing connected to said second end of said fluid conduit, said second housing having first and second openings and an internal cavity, therebetween and a second connection point inside said internal cavity;

a first valve seat disposed in said first housing and a second valve seat disposed in said second housing, said first and second valve seats positioned a first predetermined distance from each other;

a first valve body pivotally attached to said first housing at said first connection point and a second valve body pivotally attached to said second housing at said second connection point, said first and second valve seats disposed between said first and second plurality of valve bodies; and a flexible yet substantially rigid cable for retaining said first and second valve bodies from said first and second valve seats, respectively, during an open fluid flow condition, and pivotally seating one or more of said first and second valve bodies with said first and second valve seats, respectively, during a fluid conduit failure;

wherein said first or second housing is a separable coupling according to previously described embodiments of the invention.

The flexible yet substantially rigid cable may be attached to the first and second valve bodies. The substantially rigid cable may be longer than the flexible fluid conduit. The substantially rigid cable is positioned within said flexible fluid conduit in a substantially serpentine position.

In another aspect, the invention provides a safety system for a fluid conduit comprising:

a hose having first and second ends;

a first housing containing a valve seat disposed at said first end of said hose and a second housing containing a second valve seat disposed at said second end of said hose, said first and second valve seats positioned a first predetermined distance from each other;

a first valve body disposed within and pivotally attached to said first housing, and a second valve body disposed within and pivotally attached to said second housing, said first and second valve seats disposed between said first and second valve bodies, said first and second valve bodies positioned a second predetermined distance from said first and second valve seats, respectively;

a flexible yet substantially rigid cable having first and second cable ends, positioned within said hose, said first cable end connected to said first valve body and said second cable end connected to said second valve body, said cable retaining said first and second valve bodies said second predetermined distance from said first and second valve seats, respectively, during an open flow condition, and seating one or both of said first and second valve bodies with said first and second valve seats, respectively, during a hose failure;

wherein said first or second housing is a separable coupling according to previously described embodiments. The first housing may be connected to said first end of said hose, said first housing having first and second openings and an internal cavity, therebetween and a first connection point inside said internal cavity. The second housing may be connected to said second end of said hose, said second housing having first and second openings and an internal cavity, therebetween and a second connection point inside said internal cavity. The internal cavity of said first housing may further comprise a first recess for retaining said first valve body during an open flow condition substantially out of the flow path of said fluid. The internal cavity of the second housing may further comprise a second recess for retaining said second valve body during an open flow condition substantially out of the flow path of said fluid. The first valve body may be comprised of a main body having, first and second extensions therefrom, said first extension pivotally attached to said second connection point and said second extension attached to said retaining means and a sealable surface for sealably engaging said second valve seat when said second valve body seats with said second valve seat.

In another aspect, the invention provides a heat dissipation fitting for a fluid conduit, comprising a first end capable of attaching to a fluid conduit;

a second end capable of attaching to a fluid manifold; and a plurality of heat dissipation fins.

A fluid conduit system of the invention may employ both a fluid conduit and at least one heat dissipation fitting as previously described, and may further comprise a separable coupling as previously described.

These and further objects, features, and advantages of the present invention will become apparent from the following detailed description, wherein reference is made to the figures in the accompanying drawings.

BRIEF DESCRIPTION OF THE DRAWINGS

FIG. 2 is a cut away view of a single valve of a fluid/gas conduit safety system with the valve open, allowing full gas/fluid flow;

FIG. 3 is a cut away view of a fluid/gas conduit safety system allowing no gas/fluid flow, because of a break in the conduit in accordance with the present invention;

FIG. 13 is a cut away view of a breakaway connector for use with a fluid/gas conduit safety system in accordance with the present invention; and FIG. 14 is a cut away view of a breakaway connector for use with a fluid/gas conduit safety system in accordance with the present invention;

FIG. 15 is a cut away view of a breakaway connector and fluid/gas conduit safety system in accordance with the present invention;

FIG. 16 is a cut away view of a breakaway connector and fluid/gas conduit safety system in accordance with the present invention;

DETAILED DESCRIPTION OF THE INVENTION

Separable Coupling

Figure 1:
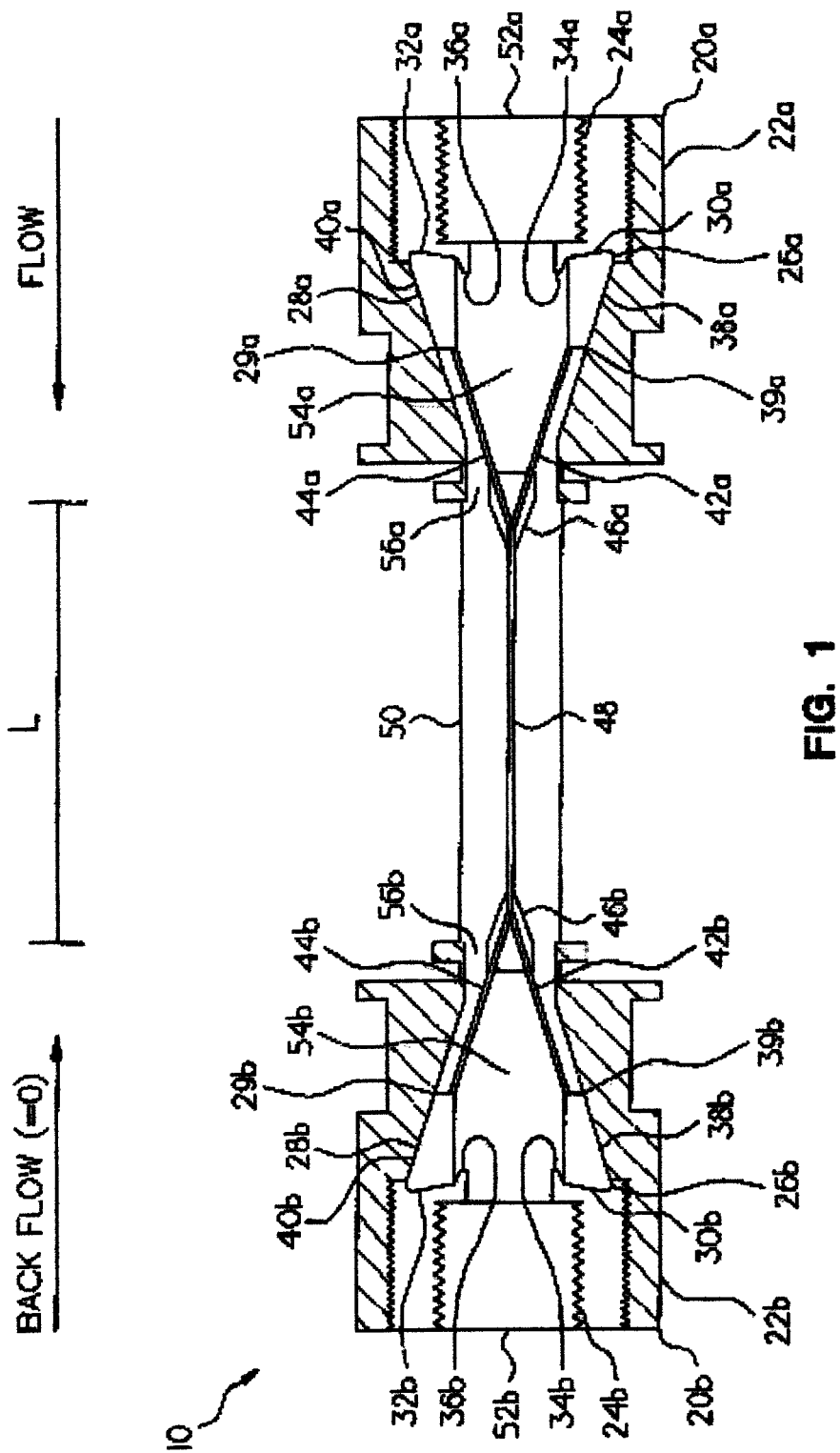
FIG. 1 is a cut away view of a fluid/gas conduit safety system allowing full gas/fluid flow in accordance with the present invention.

As exemplified in Example 2 below and in FIG. 21, the separable coupling of the invention is provided with two sides: a proximal and a distal side. The proximal side comprises a member formed of a suitable material, which may be a metal such as brass or steel, a plastic, a TEFLON™, or a composite material. Other suitable materials may be used so long as they can withstand the pressure and chemical environment as will be understood by those skilled in the art. In a preferred embodiment, the proximal side of the coupling, the side to be immediately adjacent to the hose, is a torus shape with its central hole providing the path of flow of fluid. Other embodiments may employ other shapes for the proximal and distal sides, so long as the central hole is maintained and the two sides may be secured to each other. The proximal side also has several breakaway bolt holes positioned around the central hole through which breakaway bolts may be inserted. Preferably there are 3-6 breakaway bolt holes, more preferably 3-4, most preferably 4. Additional holes may be present to reduce the weight of the proximal side without compromising its structural strength or rigidity.

The proximal side is provided with a longitudinally extended means concentric with the central hole for attachment of a fluid conduit, such as a hose. In a preferred embodiment, the means for attachment is a plurality of ridges suitable for clamping, crimping, or otherwise affixing a flexible conduit, though those of skill in the art will appreciate a variety of such attachment mechanisms, such as welding, gluing, and the like.

The separable coupling's distal side is designed to mate with the proximal side through a plurality of breakaway bolt holes aligned with those on the proximal side, such that the breakaway bolts pass through the breakaway bolt holes on both the proximal and distal sides and thereby retain the two sides together. Thus, the distal side also has a central hole for fluid flow, a plurality of holes surrounding the central hole for the breakaway bolts, and additional holes for weight reduction as desired. The distal side also is provided with a longitudinal extension concentric with the central hole, for attachment to the receptacle, or manifold, receiving fluid during operation of the fluid conduit system.

The longitudinal extension of the distal side is also provided with one end of a fluid conduit valve safety system, such as that described below in Example 1 below, and U.S. Pat. No. 6,546,947, as well as others known in the art. In contrast with such existing fluid conduit safety systems having a static end housing, the separable coupling of the invention provides similar functions to such a static end housing but with the additional advantage of having a built-in breakaway system designed to breakaway under conditions that would otherwise threaten imminent rupture or failure of other parts of the fluid conduit system. In a preferred embodiment, the valve system described in detail in Example 1 below resides within the distal side of the separable coupling such that upon the separation of the separable coupling's proximal and distal sides, the valve is actuated to the closed position and fluid flow ceases. Accidental spillage of fluid is thereby minimized or eliminated. Those of skill in the art will appreciate that a variety of valve safety systems may be employed in conjunction with the separable coupling of the invention to achieve the benefits of the invention.

In a preferred embodiment, the proximal and distal toroids are joined with breakaway bolts, which are any means known in the art, such as carriage bolts and the like. In a preferred embodiment, the breakaway bolts are carriage bolts with hexagonal heads and threaded ends for securing nuts thereto, such that the proximal and distal sides are secured by the breakaway bolts whose nuts have been tightened to sufficient torque to retain the two sides together. The breakaway bolts are selected based on their materials and specifications such that the force required to break the bolts and release the two sides from each other is less than that amount of force required to rupture the conduit itself, and less than that amount of force required to separate the conduit from the proximal side. That is, a stress condition on the conduit during flowing operation which reaches the desired "breakaway point" will cause the breakaway bolts to break, thereby separating the proximal and distal sides of the coupling, engaging the valve system so as to halt the flow of fluid through the conduit, and thereby preventing failure of the conduit itself in response to the stress. Additionally, where both ends of the hose are equipped with a valve system, a failure at the breakaway coupling closes the valves at both ends of the conduit, thereby preventing loss of fluid. Both ends of the hose may also be equipped with breakaway couplings for additional safety, and these two breakaway couplings may also be designed with different breakaway points to provide additional redundancy.

Leash System

The proximal and distal sides of the separable coupling may be joined together by a second means, a flexible leash whose attachment to both sides is stronger than the plurality of breakaway bolts. Under a stress condition which breaks the breakaway bolts, thereby separating, the separable coupling, the two sides of the now-separated coupling are restrained by the leash. Whipping of the otherwise freed proximal end of the coupling is prevented by the leash tethering of the proximal and distal sides of the coupling. In another embodiment, the leash terminates at the proximal side of the coupling, but the other end of the leash terminates at the manifold to which the coupling will be coupled. In this embodiment, if the stress has caused imminent failure in the coupling of the conduit system to the manifold (e.g., within the threaded joining of the coupling to the manifold), the invention still prevents the whipping of the otherwise freed conduit.

The leash may be any means of attaching the two sides which keeps them in relative proximity but prevents whipping action. In a preferred embodiment, the leash is a cable affixed to both proximal and distal sides, in which, upon separation, the two sides are retained within about 2-12 inches of each other, preferably 2-6 inches, more preferably 2-4 inches. The minimum distance of separation provided by the leash is determined by the distance required to engage the particular valve system being employed within the longitudinal extension of the distal side. For example, in one embodiment employing the fluid conduit safety system of Example 1 below, a desired breakaway distance is required to completely seat the valve bodies in the valve seats, thus the leash is designed to provide more than that distance of separation upon a breakaway occurrence to insure that upon a breakaway occurrence the fluid flow is halted. The leash may alternatively be in the form of a hinge mechanism, such that upon breakage of the breakaway bolts, the two sides of the separable coupling hinge apart.

In one embodiment, the separable coupling of the invention is provided on both ends of a fluid conduit system, each comprising a safety valve system. Such a complete conduit system enjoys the advantages of breakaway safety at both ends, and safety valves at both ends, providing a conduit system which fails upon a stress condition in a desirable location, that is, at the separable coupling. When equipped with the leash system, the invention also prevents uncontrolled whipping of ruptured ends, and still halts the flow of potentially hazardous substances before such substances can spill to a substantial degree.

The proximal and distal sides of the separable coupling may be provided with a variety of optional features, such as alternative release valve systems, and the like. Additionally, either side may be provided with heat dissipation fins as described in more detail below.

Heat Dissipation Fins

The invention also includes a heat dissipation feature providing additional safety for the operation of a fluid, particularly gas, conduit system. Ordinary fittings at the ends of fluid conduit, made of such materials as brass or steel, a plastic, a TEFLON™, or a composite material, tend to heat to excessive levels during operation at high pressure in smaller gauge conduit. The inventors herein have discovered that this heat may be controlled by means of providing fins built in to the fitting itself. Materials such as brass or steel, a plastic, a TEFLON™, or a composite material, may be provided with such fins, as shown in FIG. 22. Other suitable materials may be used so long as they can withstand the pressure and chemical environment as will be understood by those skilled in the art A plurality of fins provide a substantial increase in surface area over that of an ordinary fitting, providing a substantial increase in the heat which can be dissipated from the fitting. The overall temperature of the fitting, is thereby reduced, concomitantly reducing, the stress caused by such excessive heat on the system, and reducing the likelihood of failure in the system.

The fins are a plurality of extensions and depressions from a central cavity in the fitting through which fluid flows. Such fins are known in the art many applications, but have not heretofore been employed to dissipate in a fluid conduit safety system. In a preferred embodiment, a heat dissipating fitting comprises from 3-20 fins, preferably 8-12 fins, more preferably about 10 fins. Additionally, the heat dissipation fins may be used with any couplings known in the art, or with the separable coupling previously described above.

The following Examples serve to illustrate the present invention and are not intended to limit its scope in any way.

EXAMPLES

Example 1

A Fluid Conduit System Suitable for Use of the Separable Coupling of the Invention There is shown in FIG. 1 a fluid/gas conduit safety system 10. Fluid/gas conduit system 10 is comprised generally of a pair of connector ends 20a and 20b, a fluid/gas conduit or hose 50 disposed between and attached to the respective connectors and an internal cable 48 within hose 50, so that compressed gas or fluids can flow through connector ends 20a and 20b and hose 50 without leakage. Fluids and gasses can generally be collectively referred to as fluids.

Connector ends 20a and 20b are identical in design, except that they are positioned at opposite ends of hose 50. Accordingly, gasses or fluids will flow from one connector end to the other, depending upon whether a container fill or a container empty procedure is taking place. Connector ends 20a and 20b, when attached to their respective ends of hose 50 are positioned a predetermined distance from each other, determined by the length of hose 50. For purposes of illustration, connector ends 20a and 20b will be described by reference to connector end 20a, with the understanding that connector end 20b is constructed identically, with like reference numbers having a "b" designation instead of an "a" designation. In FIGS. 2 and 3, only reference numbers are used, without the "a" and "b" designations.

Connector end 20a includes a body or housing 22a and means for connection to a source or destination, such as threads 24 for connection to a valve, container, manifold or other connection for the fill or discharge of gas or fluid. Connector end 20a has two openings. In an exemplary embodiment, housing 20a is made of a metal such as brass or steel. Other materials can be used that can withstand the pressure and chemical environment as will be understood by those skilled in the art. A first aperture or opening 52a allows fluids to enter or leave connector end 20a and the fluid/gas conduit system 10. A second aperture or opening 56a allows gas or fluid to enter or leave hose 50 via connector end 20a. Connector end 20a may also include securing means (not shown) for securing hose 50 to connector end 20a such as a ferrule, clamp or adhesive. Connector end 20a is substantially hollow, containing a center cavity 54a through which gasses or fluids may pass between opening 52a and 56a.

Two wedge shaped valve bodies 28a and 26a are disposed in center cavity 54a. In an exemplary embodiment, valve bodies 28a and 26a are made of a metal such as brass or steel, a plastic, a TEFLON™, or a composite material. Other materials can be used that can withstand the pressure and chemical environment as will be understood by those skilled in the art. Each valve body is angled in a generally wedge shape. In an exemplary embodiment, wedge shaped valve bodies 28a and 26a are substantially the same size, with the most acute end of each wedge shaped valve body, 29a and 39a, pointed in the direction of opening 56a. Also in an exemplary embodiment, each valve body is wedge shaped with the side closest to its respective sidewall (40a and 38a), curved in substantially the same shape as the respective sidewall. The side opposite end 29a is seated against back wall 32a and between lip 36a and angled sidewall 40a when in the open or gas/fluid flow position. The side opposite end 39a is seated against back wall 30a and between lip 34a and angled sidewall 38a when in the open or gas/fluid flow position. The respective sidewalls, backwalls and lips form a recess within which, the respective valve body is positioned when the valve is in an open position. Valve bodies 28a and 26a are maintained in the open position by links 44a and 42a, respectively. Links 44a and 42a are made of a material that allows valve bodies 28a and 26a to remain in the open position to allow gas/fluid flow and pull valve bodies 28a and 26a into the closed or sealed position (described below) to restrict gas/fluid flow. In an exemplary embodiment, links 42a and 44a are rigid metal rods made from stainless steel or monel. Other metals and materials such as brass, cable, plastic, and composites may be used as will understood by those skilled in the art. A first end of links 44a and 42a is connected to valve bodies 28a and 26a at valve ends 29a and 39a, respectively. Also in an exemplary embodiment, links 44a and 42a are substantially the same length.

Links 44a and 42a are connected to internal cable 48. In an exemplary embodiment, a multipoint connector 46a is used to attach links 44a and 42a to internal cable 48. Multipoint connector 46a can be made of metal such as brass or steel. Other materials can be used that can withstand the pressure and chemical environment as will be understood by those skilled in the art.

Internal cable 48 is also made from a flexible yet relatively stiff material capable of retaining valve bodies 28a and 26a in the respective recesses in an open position allowing gas/fluid flow during normal operation. Exemplary materials for internal cable 48 are steel cable or braided cable. Other suitable materials for internal cable 48 will be understood by those skilled in the art. Internal cable 48 can be considered a valve control means, particularly in combination with cables 44a and 42a.

Hose 50 is shown having a length L. A cut, tear, rupture or stretch of hose 50 can cause hose 50 to increase in length L, constituting a failure condition. Flow and hack flow directions are also shown. Flow is considered the gas/fluid fill or evacuation direction. Back flow is considered the resisting pressure Opening 56a is generally circular with sidewalls 40a and 38a extending at an angle away from opening 56a towards backwalls 32a and 30a, respectively. In an exemplary embodiment, internal cavity 54a is generally conical with a truncated apex at or near opening 56a and a base defined at or near backwalls 32a and 30a. Sidewalls 40a and 38a extend from the base portion to the apex portion. The upper part of sidewalls 40a and 38a at the apex section of internal cavity 54a serves as the valve seat in housing 22a. This is identified as valve seats 57 and 59 in the cut away view of FIG. 2. In an alternative embodiment, the cylindrical sidewall surface that defines opening 56a can serve as the valve seat of the present invention. In an additional embodiment (not shown) an O-ring may serve or be a part of the valve seat. Valve bodies 26a and 28a seat in valve seats 57 and 59 when in the closed position. In an exemplary embodiment, wedge shaped valve bodies 28a and 26a are angled substantially the same as the angle of conical sidewalls 40a and 38a.

When situated in their respective recesses during open or normal operation, valve bodies 28a and 26a are positioned a predetermined distance from their respective valve seats. The distance is determined, in part, by the size of the respective housing. The closer the valve body pairs are to the valve seat, the faster the seating of the valve bodies in the valve seats during conduit failure, because of the shorter distance that the valve bodies have to travel.

FIGS. 2 and 3 show the position of valve bodies 28 and 26 in the open (FIG. 2) and closed (FIG. 3) positions.

Figure 4:
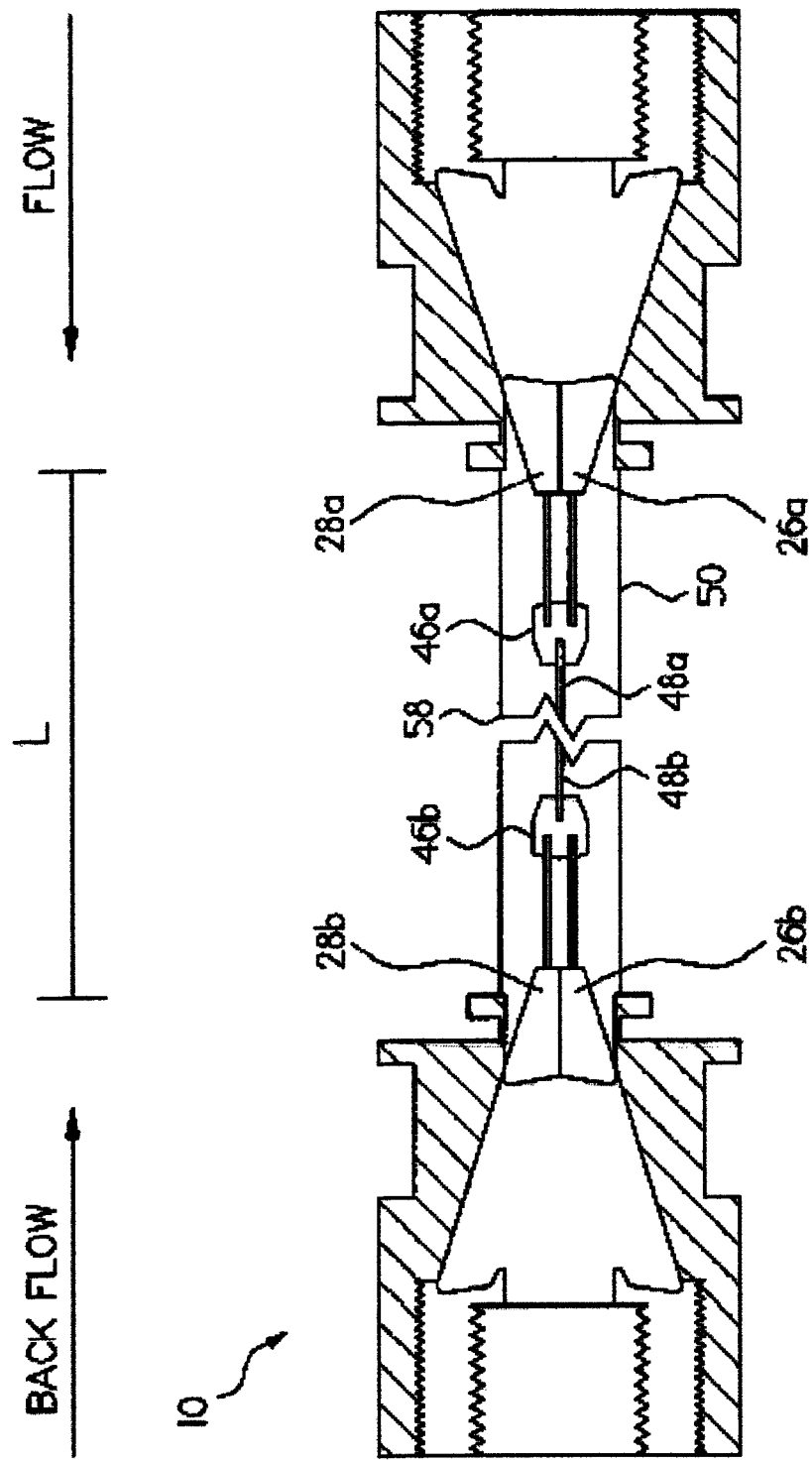
FIG. 4 is a cut away view of a fluid/gas conduit safety system allowing no gas/fluid flow because of a separation of the hose portion of the conduit in accordance with the present invention.

In FIG. 4 system 10 is shown with a cut or separation 58 in hose 50. When such a conduit failure occurs and internal cable 48 is severed internal cable 48 no longer exerts the force necessary to maintain the valve seats at a predetermined distance from the valve bodies, i.e. in the open position. Each of the valve body pairs (28a, 26a) and (28b, 26b) then engage their respective valve seats due to the pull of internal cable 48 towards the respective valve seats and/or the pressure of the gas or fluid flowing past the respective valve pairs. Each valve body pair (28a, 26a) and (28b, 26b) essentially forms a substantially solid single valve body during conduit failure when engaging the respective valve seat. When seated, the valve body pairs, acting as a single valve body, are pulled sufficiently tight and close together to prevent the flow of gas or fluid (leakage).

In an exemplary embodiment, the valve seat pairs engage the respective valve body during certain conduit failures, such as severing of hose 50, substantially simultaneously with said conduit failure. In other conduit failures, the valve seat pairs engage the respective valve body in three seconds or less. Because of the damage that can arise from a whipping hose or release of hazardous fluid/gas into the atmosphere/environment, quick seating of a valve body pair with a valve seat is advantageous.

Figure 5:
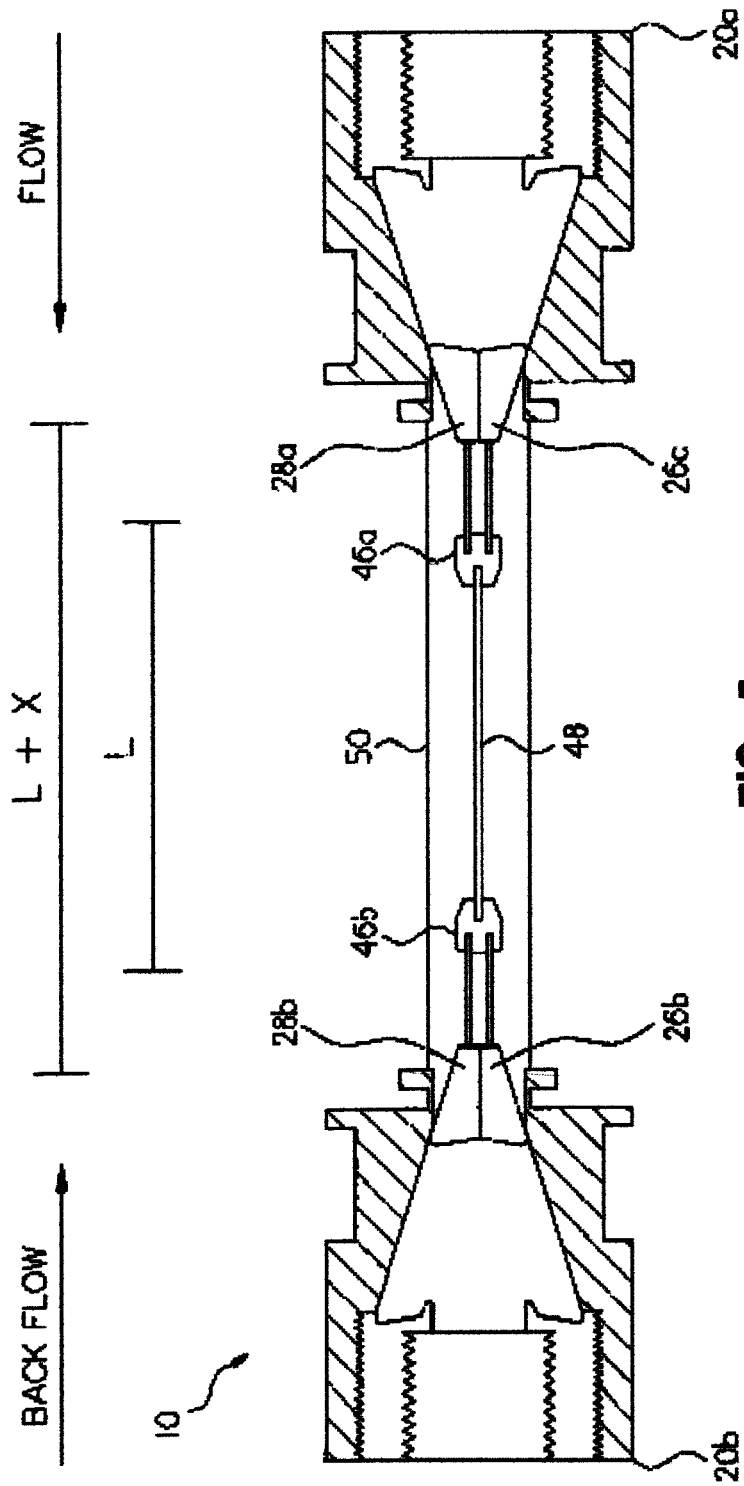
FIG. 5 is a cut away view of a fluid/gas conduit safety system allowing no gas/fluid flow because of a stretching of the hose portion of the conduit in accordance with the present invention.

In FIG. 5, system 10 is shown with hose 50 being stretched a distance X beyond hose 50's normal length L. This causes a conduit failure condition causing the respective valve body pairs to seat in the respective valve seats.

Figure 6:
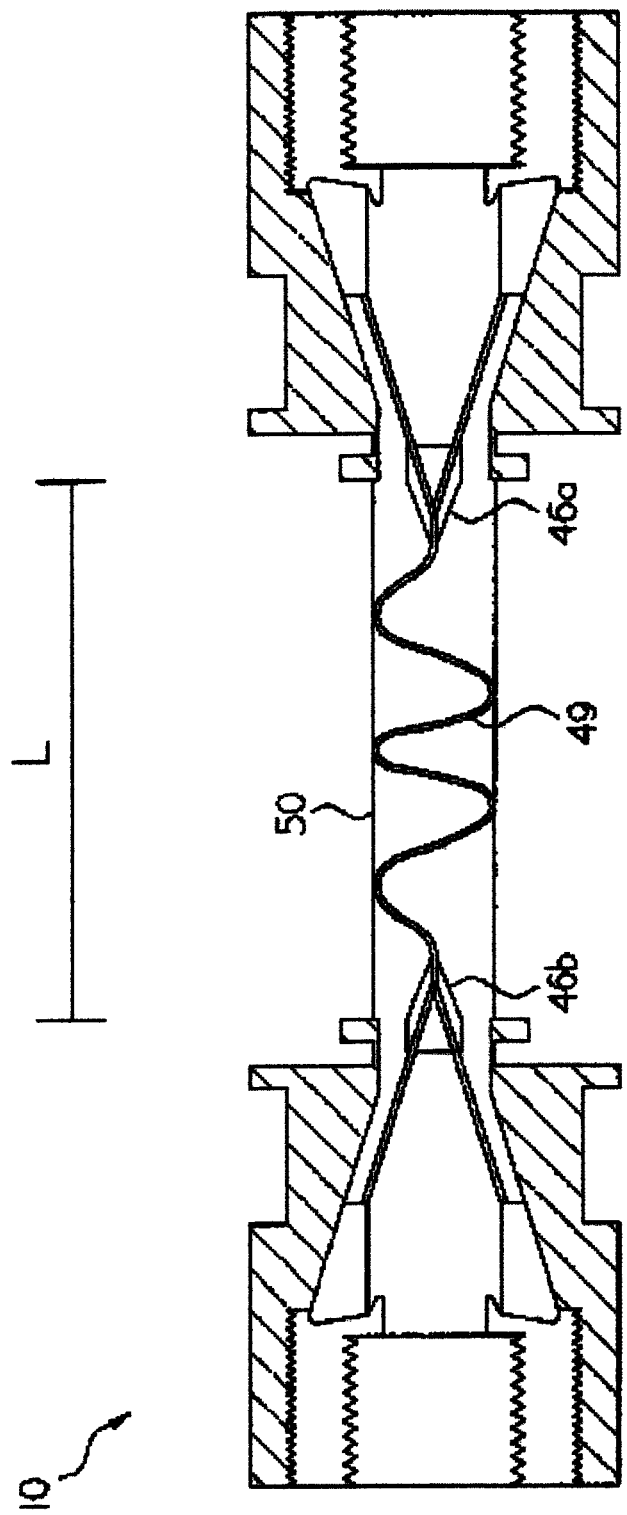
FIG. 6 is a cut away view of an additional embodiment of a fluid/gas conduit safety system in accordance with the present invention.

In FIG. 6, an alternate embodiment is shown. In this embodiment, an extended internal cable 49 has a greater length than internal cable 48 shown in FIG. 1. Extended internal cable 49 is positioned in a serpentine distribution within hose 50. This serpentine positioning provides additional flexibility and greater bending radius than a relatively straight internal cable as shown in FIG. 1. The serpentine positioning maintains sufficient force against the valve bodies to maintain them in the open position, within the respective recesses during normal, open gas/fluid flow.

In another alternate embodiment (not shown), more than two wedge shaped valve bodies are used, each valve body positioned in a separate recess when in the opened position. In such an embodiment, each wedge shaped valve body may be separately connected to separate links that are, in turn, connected to internal cable 48. The more than two valve bodies of this embodiment would still form a substantially solid valve body during conduit failure when engaging the valve seat. This alternate embodiment can be combined with the other embodiments shown in the figures and described herein.

In still another embodiment (not shown) an external cable takes the place of or operates in conjunction with internal cable 48. In such an embodiment, the external cable would be connected through a sealed linkage to the valve bodies, the internal cable, the linking cables and/or the multipoint connector.

In still another embodiment (not shown), internal cable 48 is a pressurized tube that retains the valve bodies in an open position when pressurized. When the pressure in the pressurized tube drops below a predetermined amount, there is insufficient pressure to maintain the valve bodies in an open position. At that point, the valve bodies seat, closing the valve.

In still another embodiment (not shown), an electronic circuit measures fluid/gas flow rate and/or pressure within hose 50. When pressure or flow rate reaches a predetermined level, the electronic circuit signals a valve close condition. This signal would activate a valve closing means to release any retaining member that was maintaining the valve bodies in the open position, such as by severing or contracting an internal cable or linking cable, or depressurizing an internal pressurized tube. The predetermined level in such an embodiment could also be set to account for extreme changes in flow rate or pressure, if it was desired that such a condition should result in a valve closure. Such a system could provide a monitoring or early warning system for hose/system integrity.

In another embodiment (not shown), internal valve bodies and valve seats are replaced by an external valve. Such an external valve is a valve located outside or beyond connector 20. In such an embodiment, the external valve is actuated through a sealed linkage. Valve closure would result from the same conditions as described above with respect to the internal valve bodies and valve seats.

In another embodiment (not shown), only a single valve (valve body/valve seat) is used at a single end of hose 50.

Figure 7:
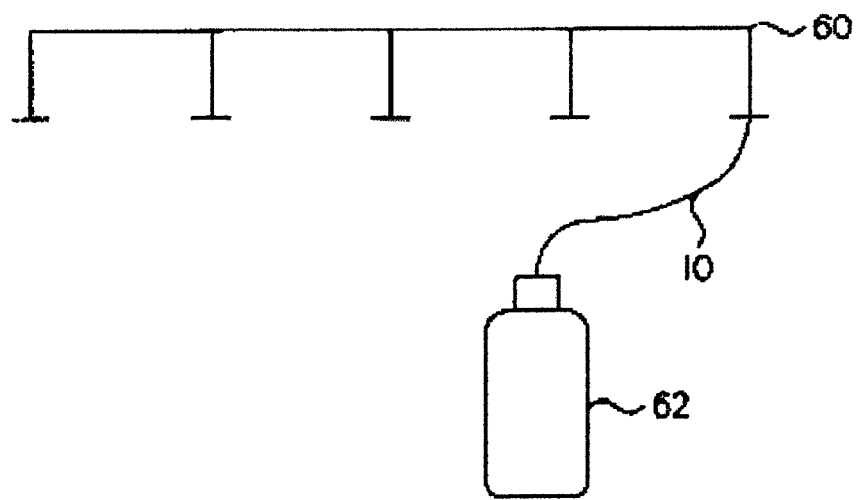
FIG. 7 is a diagram of a cylinder filling apparatus using a fluid/gas conduit safety system in accordance with the present invention.

In FIG. 7, a container filling station is shown with fluid/gas conduit safety system 10 attached to a valve connected to a container fill manifold 60 at one end and a container (cylinder) 62 valve at the other end.

Figure 8:
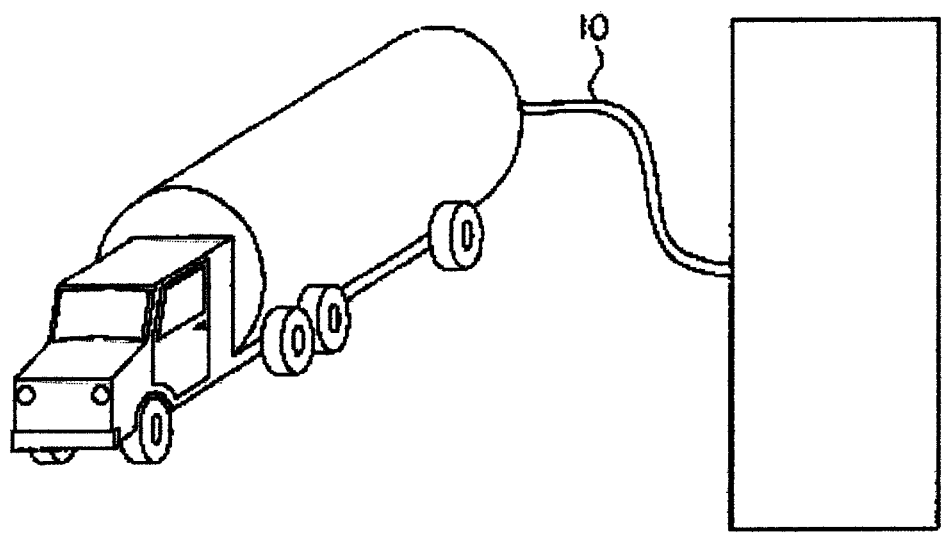
FIG. 8 is a diagram of a fluid/gas transport vehicle delivering or receiving fluid/gas to or from a source/destination through fluid/gas conduit safety system in accordance with the present invention.

FIG. 8 shows a fluid/gas transport vehicle 64 connected to a source/destination container 66 through fluid/gas conduit safety system 10. Transport vehicle 64 can be delivering or receiving fluid/gas, depending upon the particular application.

In operation, a first end of the fluid/gas conduit is connected to a filling container, while the second end of the fluid/gas conduit is connected to a receiving container. The term filling container is meant to represent a filling source and the term receiving container is meant to represent a receiving destination, regardless of whether either or both is actually a container. The exact nature of the filling container and the receiving container depends upon the ultimate application. For example, the filling container may be a transport vehicle or connected through a hose or routing system before the connection is made to the fluid/gas conduit of the present invention. A similar situation may apply to the receiving container. In addition, the receiving container may be the actual use of the gas or fluid which is thus not actually contained.

In an additional embodiment, the flexible fluid conduit, such as hose 50, shown in FIG. 1 is replaced with a non-flexible hose or pipe, such as a steel, plastic or copper pipe.

Figure 9:
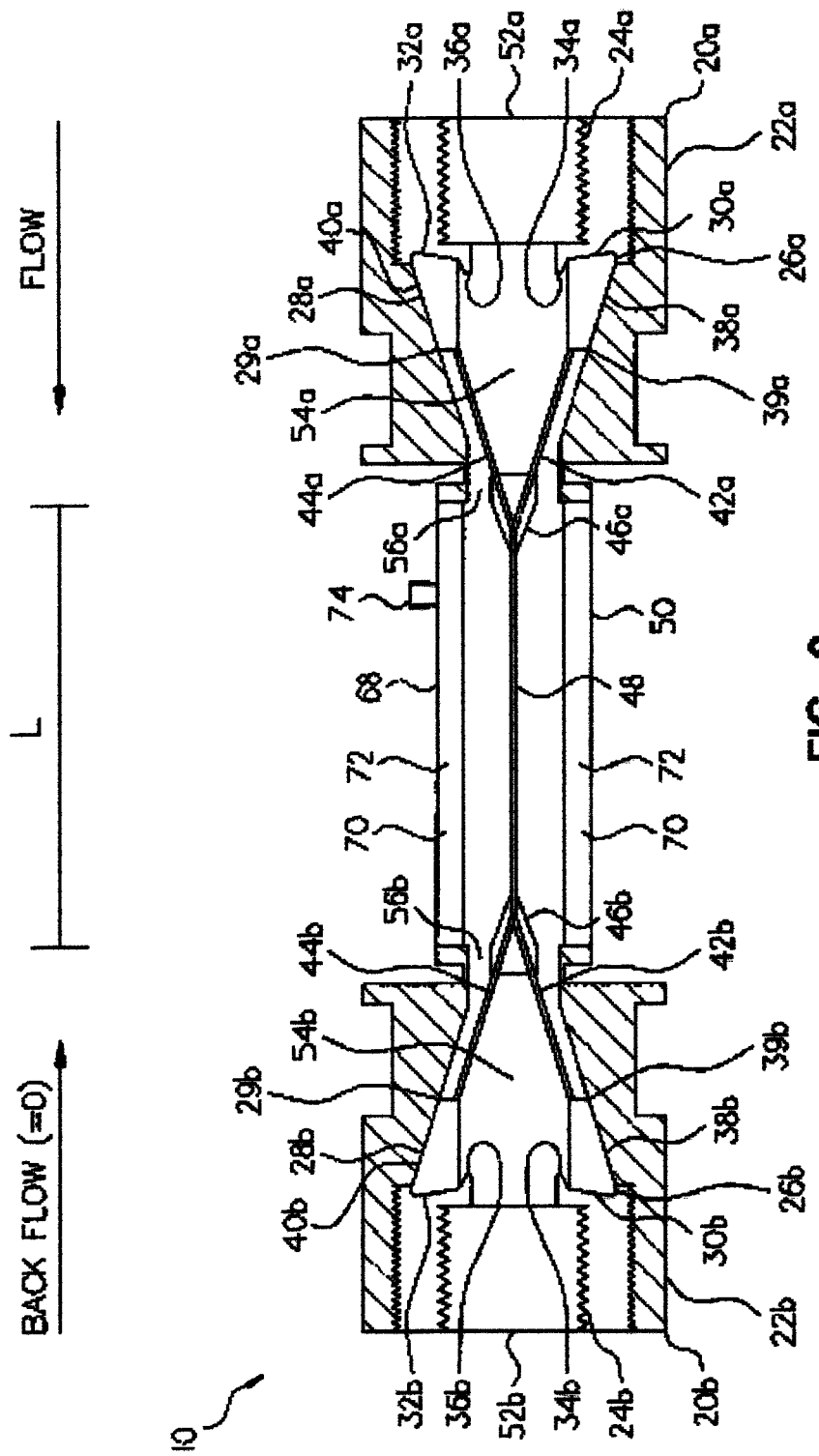
FIG. 9 is a cut away view of an additional embodiment of a fluid/gas conduit safety system in accordance with the present invention.

Still another embodiment is shown in FIG. 9, with an outer, second hose 68 surrounding an inner, hose 50 from hose system 10. Each of the inner and outer hoses is connected to a housing, such as connector housing, 22. A gap or space (cavity) 70 is defined between inner hose 50 and outer hose 68. Gap 70 is filled with a material 72 which serves to indicate whether a hose fault, such as a tear or puncture in inner hose 50 has occurred. Outer hose 68 serves as an indicator of a problem or potential problem with hose 50. Pressurized gas can be sealed in gap 70 at the factory or pressurized by an optional separate fill valve shown as fill valve 74. Fill valve 74 may be disposed on the outer hose or on the housing, so long as it is in fluid communication with the cavity farmed between the inner and outer hoses. A separate fill valve 74 allows the pressurized gas to be "topped off" to maintain pressure. A separate fill valve 74 also allows for the pressurized gas to be replaced, or if desired, replaced with a different pressurized gas. Such an indicator system is particularly useful where the hose failure has not caused a cut off condition, causing the valve bodies to seat, as described previously. Gap 70 is filled with a pressurized fluid/gas as material 72 that will indicate that a tear, cut, puncture or other breach of outer hose 68 has occurred. For example, a pinhole type puncture may not be sufficient to activate the valve seating. By using an outer, second hose with a pressurized gap, a leak in the primary inner hose will cause a pressure increase in the outer hose, causing it to deform. The deformation will be recognizable to the user. In still another embodiment, the hose material of the outer, second hose, changes color when stretched by the increase in pressure from the inner hose leak. This change in color may be more readily identifiable to the user, indicating the leak or inner hose failure.

In another embodiment, gap 70 is filled with a pressurized fluid/gas as material 72 that will indicate that a tear, cut, puncture or other breach of outer hose 68 has occurred. The pressurized gas can indicate this failure condition of outer hose 68 by being a distinct color that will be recognized by a user.

Preferably such a pressurized gas will be a different color than any fluid being transported through the hose system. A pressurized gas may also be used that reacts with the fluid being transported through the hose system so that in the event of a hose failure. In this way, a first distinct color would be evident if there was only a failure with outer hose 68. A second distinct color would be evident if the pressurized gas was contaminated with the fluid being transported through the hose system. In this way, the user could tell if there was an outer hose 68 failure or a failure of both inner hose 50 and outer hose 68.

In still an additional embodiment of the system shown in FIG. 9, gap 70 is filled with a sealing material that can seal a puncture, small tear, small cut or other minor breach of either hose 50 or hose 68. Such a sealing material would harden or flexibly harden to match the flexible properties of the respective hose when in contact with the either the fluid being transported through the hose system (in the case of a breach of hose 50) or by the outside air (in the case of a breach of outer hose 68). A sealing material of this type would preferably appear as a deformation (bump, irregularity, ridge, blob) or distinct color on the surface of outer hose 68 in the case of a breach of outer hose 68. A sealing material of this type, in conjunction with the material of outer hose 68 would preferably show a deformation in the shape of outer hose 68 in the event of a hose breach of inner hose 50 where there is no breach of outer hose 68. Because a hose system of the present invention is a safety system, it is desirable that an outer hose with a sealing material in gap 70 be used in conjunction with a cut off system, such as one of those described throughout this specification. In this way, the sealing material would only serve as a temporary fix to a minor hose breach problem, with the main cut off system still in place in the event that the hose breach problem worsened or was not temporarily solved by the sealing material. A sealing mechanism also controls the amount of gas that can leak into the atmosphere.

Figure 10:
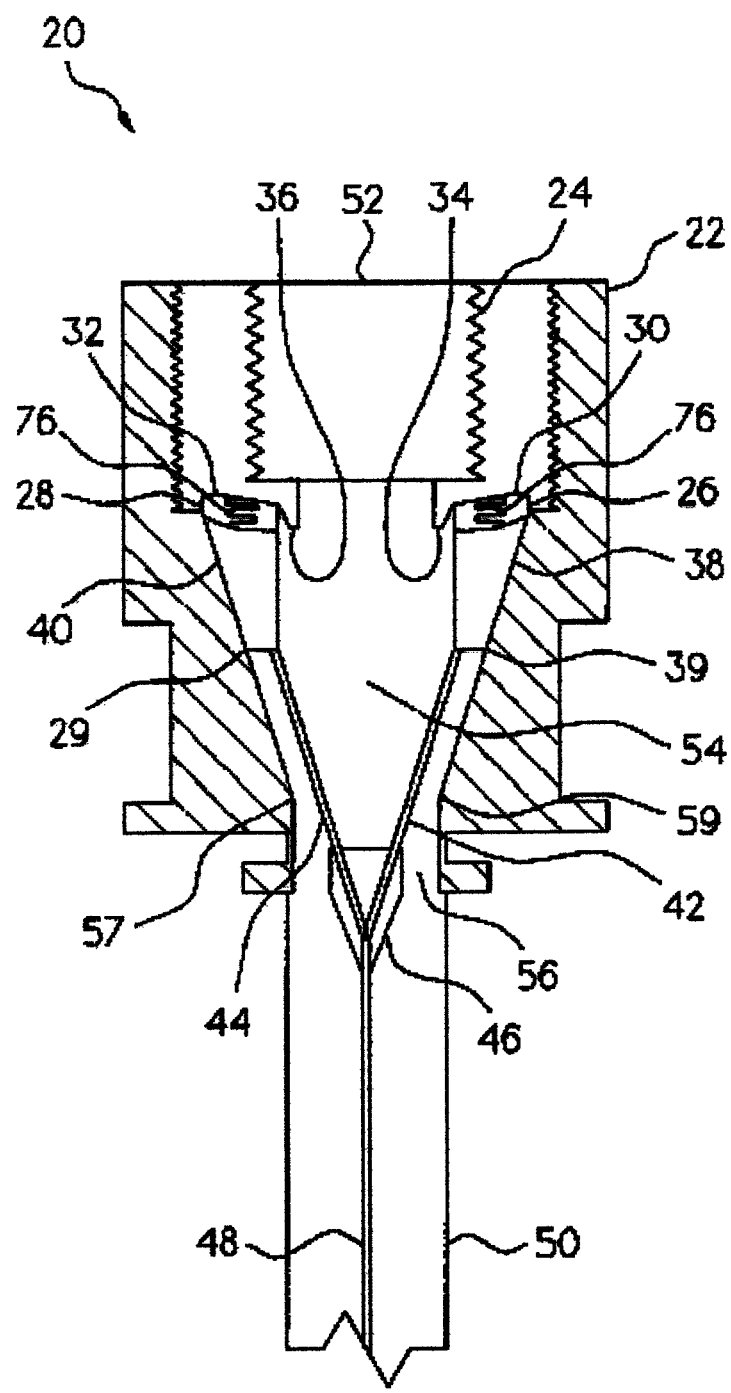
FIG. 10 is a cut away view of a single valve of an additional embodiment of a fluid/gas conduit safety system in accordance with the present invention.

FIG. 10 shows still another embodiment of the present invention. A spring 76 is positioned behind each wedge shaped valve body 26 and 28. Springs 76 bias the valve bodies against the valve control means, such as cable 48 and linking cables 42 and 44. Springs 76 insure and accelerate valve closure by forcing the seating of the wedge shaped valve bodies upon a hose failure. When a hose failure occurs, counter pressure from cables 44 and 42 is removed, allowing springs 76 to expand, forcing each wedge shaped valve body to seat. In a sub-embodiment, a single spring is used, instead of a separate spring for each wedge shaped body. This single spring would contact back wall 30 and the side of the wedge shaped valve body that would otherwise be in contact with back wall 30.

Figure 11:
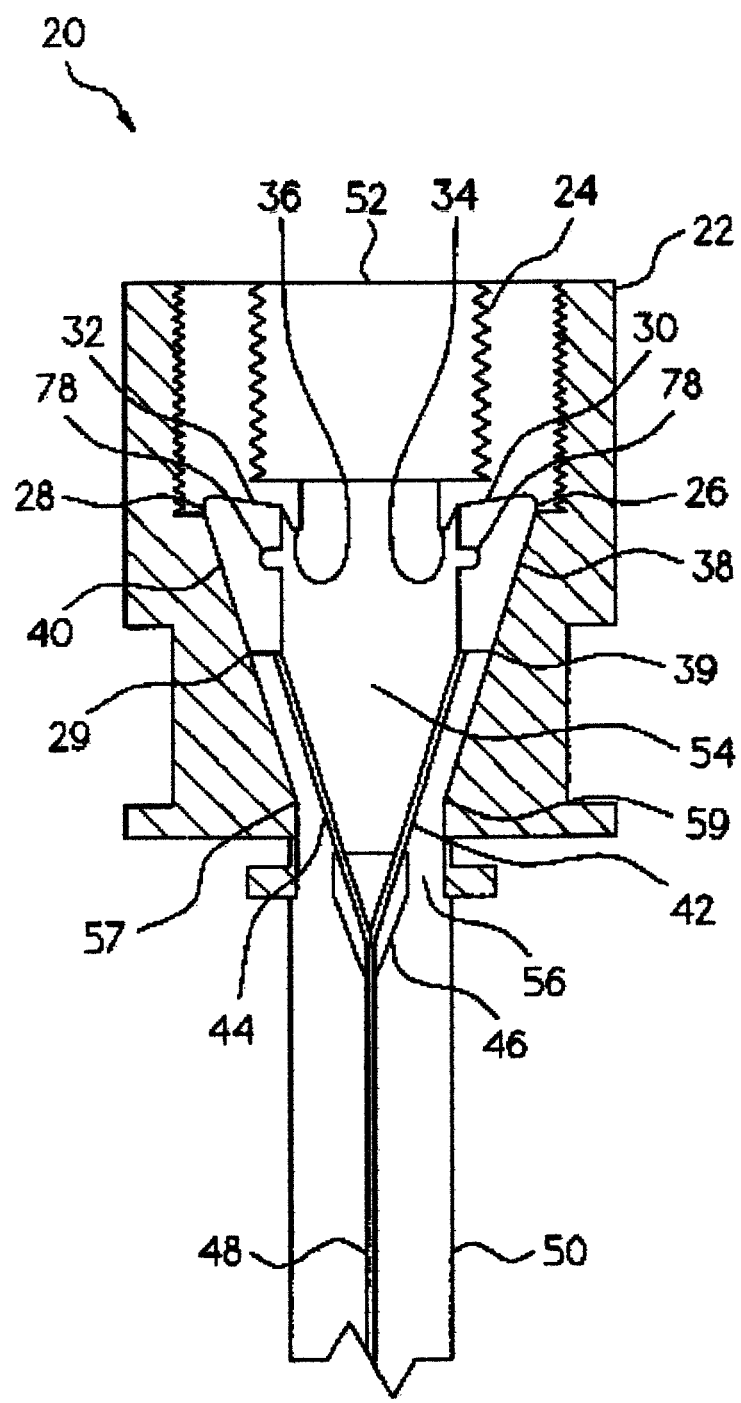
FIG. 11 is a cut away view of a single valve of an additional embodiment of a fluid/gas conduit safety system in accordance with the present invention.

FIG. 11 shows still another embodiment of the present invention. A flap or edge 78 is shown on the surface of each wedge shaped valve body 26 and 28 in the path of fluid flow. In the event of a hose failure and release of the counter pressure holding back each wedge shaped valve body, flap 78 assists the seating and speed of seating of each wedge shaped valve body 26 and 28 due to the pressure of the fluid. Flap 78 is preferably of a size that does not inhibit the satisfactory flow of the fluid. Flap 78 is of a size and orientation that will not interfere with seating of the valve bodies with the valve seats during a hose failure.

Figure 12:
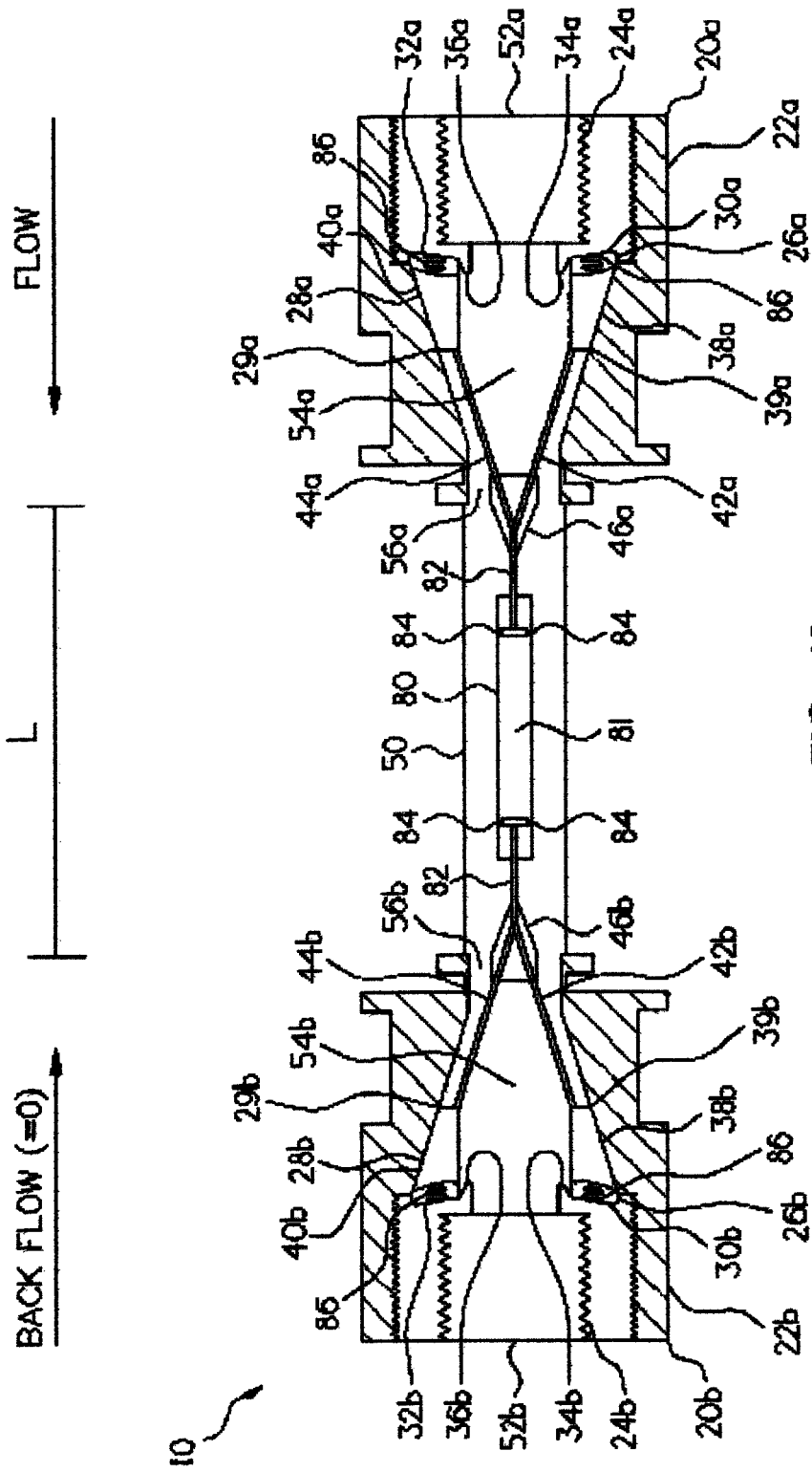
FIG. 12 is a cut away view of an additional embodiment of a fluid/gas conduit safety system in accordance with the present invention.

FIG. 12 shows another embodiment of the present invention wherein cable 48 is replaced with a pressurized tube 80 containing, a gas/fluid 81. In an exemplary embodiment, pressurized tube 80 is terminated at each end with a piston 82. Each piston 82 is then connected to a pair of links, such as links 42a and 44a. A mulitpoint connector, such as multipoint connector 46a. Like in the previous embodiments, metal rods can be used for links 42a and 44a. Pressurized tube 80 can be made of a material such as a flexible plastic or Teflon®. Pistons 82 can be made of a material such as plastic or stainless steel. Pistons 82 are shown with o-rings 84 forming a seal between the piston wall and the inside wall of tube 80. O-rings 84 allow limited movement of pistons within pressurized tube 80, due to flexing of hose 50. In combination with pressurized tube 80 is a spring mechanism 86. Spring mechanism 86 adds a bias against the pressure from pressurized hose 80. Upon failure, one or both pistons 82 are released, depressurizing hose 80 and thereby releasing the counterpressure against spring mechanism 86. The wing force then causes the valve bodies to move into a sealing arrangement by seating in the valve seat. The pressurized hose design is particularly useful for longer distances where there may be so many coils/bends in cable 48 that it can not maintain adequate pressure against the valve seats.

Referring to FIGS. 13 and 14, a breakaway coupling system 90 is shown for use with the present invention. Breakaway coupling system 90 is used as an alternative form of coupling or connection to a pressurized fluid transfer or delivery system to that of the threaded connector ends 20a and 20b shown in the previous embodiments.

Breakaway coupling system 90 is comprised of a barb 92, a fitting 94, a release collar 96, a snap ring 98 and ball bearings 100. O-rings 102 are also shown to provide, a seal. Threads 24 are shown for mating with the delivery source and/or receiving destination of the pressurized fluid, similar to threads 24 shown and described with respect to previous embodiments.

Barb 92 is inserted into a hose, such as hose 50. A plurality of ridges 104 may be formed on the surface of barb 92 to assist in securing barb 92 to hose 50. A securing means such as a crimped ferrule 106 or screw tightened securing ring (not shown) is used to secure hose 50 to barb 92. Barb 92 has grooves for o-rings 102b, 102c and 102d. Fewer or greater number of o-ring grooves and corresponding O-rings may be used, depending upon the application. O-rings 102 act as seal to prevent leakage of pressurized fluid. Barb 92 also has an indentation or groove 110, in which a ball bearing 100 can sit. In an exemplary embodiment, 12 ball bearings 100 are used with a corresponding groove 110. Fewer or greater number of ball bearings 100 and corresponding indentations or groove 110 may be used, depending upon the application.

Barb 92 is inserted into a fitting 94. Fitting 94 provides the structural detail to mount breakaway system 90 to the delivery/destination equipment for the pressurized fluid. In the exemplary embodiment shown, threads 24 are shown. Other connection or coupling means may be used as understood by those skilled in the art. Fitting 94 has an opening for mating with barb 92. O-rings 102b and 102c form a seal against the internal walls of the barb receiving opening of fitting 92. Holes 112 extend through fitting 94 and have a diameter sufficient to receive ball bearings 100. If not blocked, ball bearings 100 can freely pass through holes 112. Holes 112 are designed to align with radiused groove 110 when barb 92 is fully inserted into fitting 94. Fitting 94 also has a groove for o-ring 102a. O-rings 102a and 102d are used to seal against release collar 96. A ramp sided groove 114 is for retaining a snap ring 98. Ramp sided groove 114 has inclined walls, wherein the inclination of the walls determines the release force necessary to overcome the retaining spring force of snap ring 98. The force necessary to allow a release condition can be set or adjusted by varying the ramp angle of ramp sided groove 114 and/or the spring force of snap ring 98

Release collar 96 has a recess or clearance groove 116 for snap ring 98 and a recess or clearance groove 118 for ball bearing 100. When barb 92 is fitted within fitting 94 and the barb fitting combination is fitted within release collar 96, snap ring 98 is positioned in both clearance groove 116 and ramp sided groove 114, aligning and securing the components of breakaway system 90. Release collar 96 can slide laterally over fitting 94. In the exemplary embodiment, release collar 96 has a tapered or stepped internal cavity which allows fitting 94 to be inserted from one side only. Upon release, this prevents fitting 94 from being pulled out along with barb 92. Release collar 96 is mounted via a mounting means, such as a bracket (not shown) to the delivery and/or destination equipment.

Operation of breakaway system 90 is shown, first with respect to FIG. 14 with release collar 96 in the neutral or engaged position. In the neutral position, release collar 96 is positioned such that the inner wall of the opening in which fitting 94 is positioned presses against ball bearing 100, keeping ball bearing 100 pressed into groove 110 of barb 92. This downward force from the internal wall of fitting 94 maintains barb 92 locked to fitting 94, which is in turn, locked to release collar 96 by snap ring 98.

Upon a release condition, a force, such as the pulling of hose 50 away from fitting 94 (in the release direction), pulls on barb 92. Because barb 92 is locked to fitting 94 and release collar 96 is fixedly mounted to the delivery and/or destination equipment, the barb 92/fitting 94 combination will move laterally with respect to collar 96, from the neutral position shown in FIG. 14 to the release position shown in FIG. 13. In order for this movement to occur, the force pulling on barb 92 must be sufficient to overcome the snap ring force of snap ring 98. This force causes snap ring 98 to bear against the ramps of ramp sided groove 114. This cause the snap ring to expand and be forced out of ramp sided groove 114. This then allows fitting 94 to move relative to release collar 96. Once moved, ball bearings 100 and holes 112 become aligned with clearance grooves 118. Clearance grooves 118 allow ball bearings 100 to move out of engagement with grooves 110, freeing barb 92 from engagement with fitting 94.

In an exemplary embodiment shown in FIGS. 15 and 16, the above described safety system is fitted within a breakaway system 90, so that upon a breakaway/release condition, the safety system is activated, shutting off fluid flow by seating of the valve bodies in the valve seats. In such a breakaway system, one or more connectors, such as multipoint connector 46 may be designed to allow separation from cable 48 or links 42/44 after enough force has been exerted to seat valve bodies 26/28 in valve seats 57/59. This would prevent further damage from pulling on the destination/source equipment, while still cutting off fluid flow. A condition that can cause such a breakaway condition is a container truck driving away with a transfer hose still attached to the fill/delivery station and the truck When safety system 10 and breakaway system 90 are used a hose 50, containment of pressurized fluid is achieved at both ends during a breakaway failure condition. Breakaway system 90 may be used on one or both ends of a hose 50, but will generally be used on one end.

FIGS. 17-20 show a fluid gas conduit safety system 200 using a pivotally connected, single valve body in each of the end fittings assemblies to effectuate the seal enclosure in the event of hose failure during fluid flaw.

Figure 17:
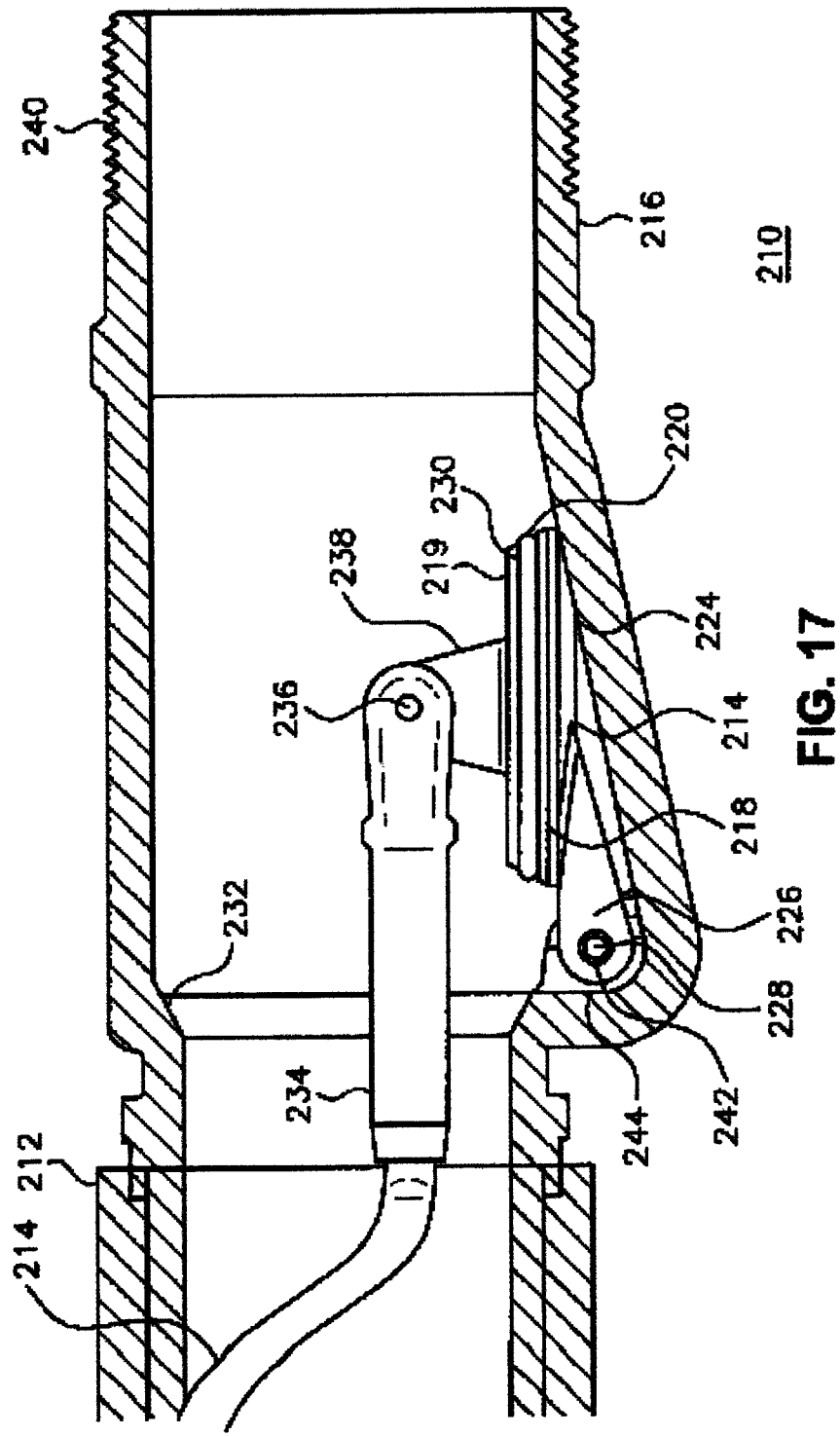
FIG. 17 is a cut away view of an additional embodiment of a single valve of a fluid/gas conduit safety system with the valve open, allowing full gas/fluid flow.

In FIG. 17, a connector end 210 is shown. Connector end 210 is an end fitting assembly for one end of a fluid/gas conduit safety system 200. Connector end 210 is comprised of a body or housing 216. Body 216 serves as the end fitting of the end fitting assembly 210. Body 216 has first and second openings or apertures with an internal cavity disposed therebetween.

A valve 218 is shown contained in the internal cavity within body 216. Valve 218 seats with valve seat 232 to form a seal during a failure or closure condition. Valve 218 includes an O-ring 220 which encircles a valve body 219. The outer edge of O-ring 220 is a valve sealing surface 230 which makes a sealable connection with valve seat 232. Valve 218 also includes a valve leg 226 which extends from the back or non-sealing side of valve 218. Valve leg 226 is attached to body 216 via hinge pin 228 and hinge pin plug 242. Valve leg 226 is attached to body 216 in a recess or cavity 244 to reduce interference with fluid flow by valve 218. Attached to the front or sealing side of 218 is valve arm 238. Valve arm 238 is attached to a first end of connector 234 via connector pin 236. A second end of connector 234 is attached to internal cable 214. Valve leg 226 and valve arm 238 are extensions that extend from valve body 219.

Valve 218 is shown in the rest position in FIG. 17. In the rest position, valve 218 rests against rest point 224 to minimize impeding fluid flow. Valve 218 is shown in the open or fluid flow condition in FIG. 17.

While threads 240 are shown for body 216, other connection means for the hose will be understood by those skilled in the art. One example of another connection means is a bayonet type closure. Also, body 216 is shown contained within hose 212. Means for securing hose 212 and body 216 will also be understood by those skilled in the art, or previously described therein.

Figure 18:
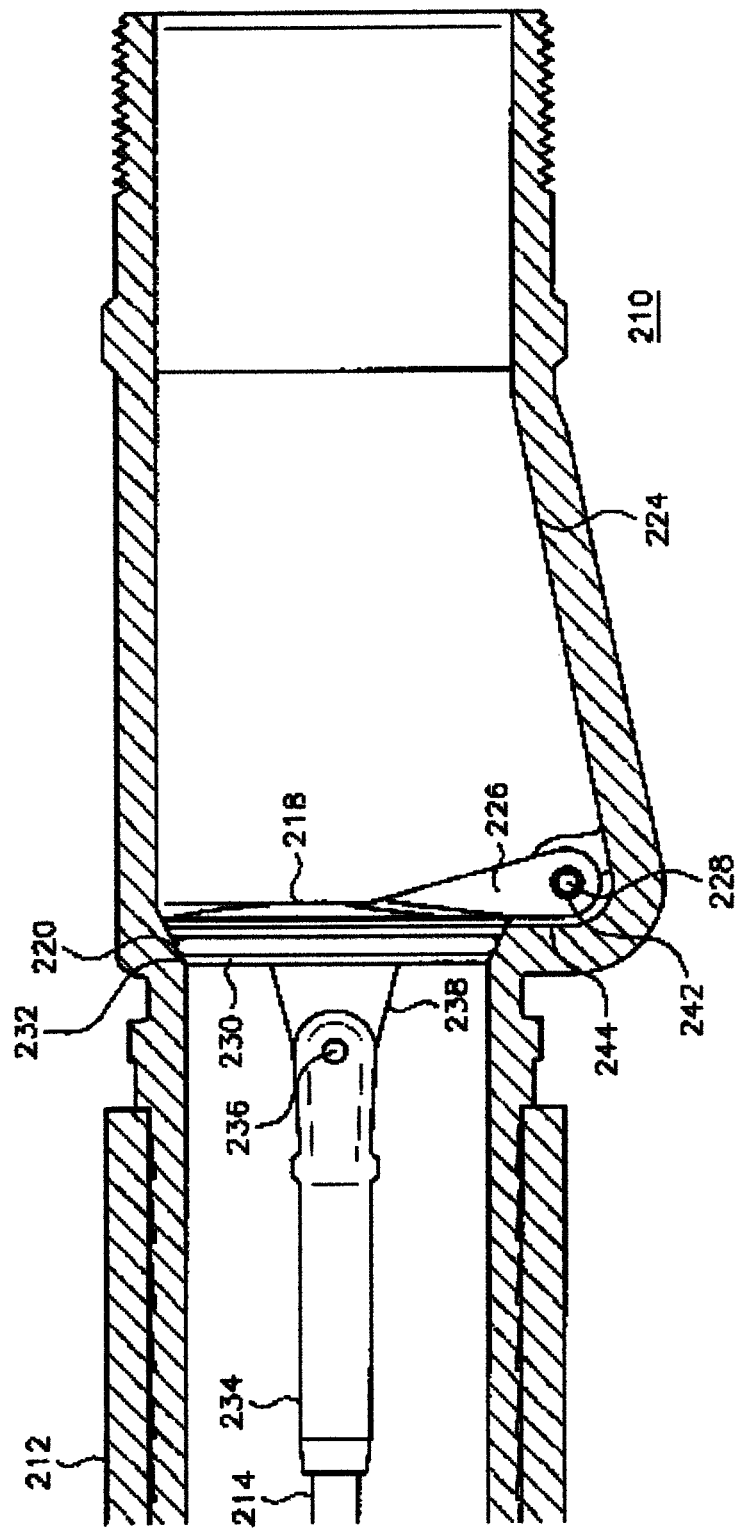
FIG. 18 is a cut away view of an additional embodiment of a fluid/gas conduit safety system with the valve closed, allowing no gas/fluid flow, because of a break in the conduit in accordance with the present invention.

In FIG. 18, connector end 210 is shown with valve 218 in a closed position. The closed position occurs when a hose failure or other failure condition, such as those previously described, takes place. In the closed position, valve sealing surface 230 of O-ring 220 contacts valve seat 232, forming a seal. In this state, valve 218 has pivoted about hinge pin 228, rotating valve 218 into the closed position. Valve 218 is maintained in the closed position by the pressure exerted from the fluid/gas against the back or non-sealing side of valve 218. Additional sealing force may be provided by cable 214 pulling on valve 218 through connector 234 and hinge pin 236. Fluid conduit or hose 212 may be flexible, or non-flexible, upon the application.

Figure 19:
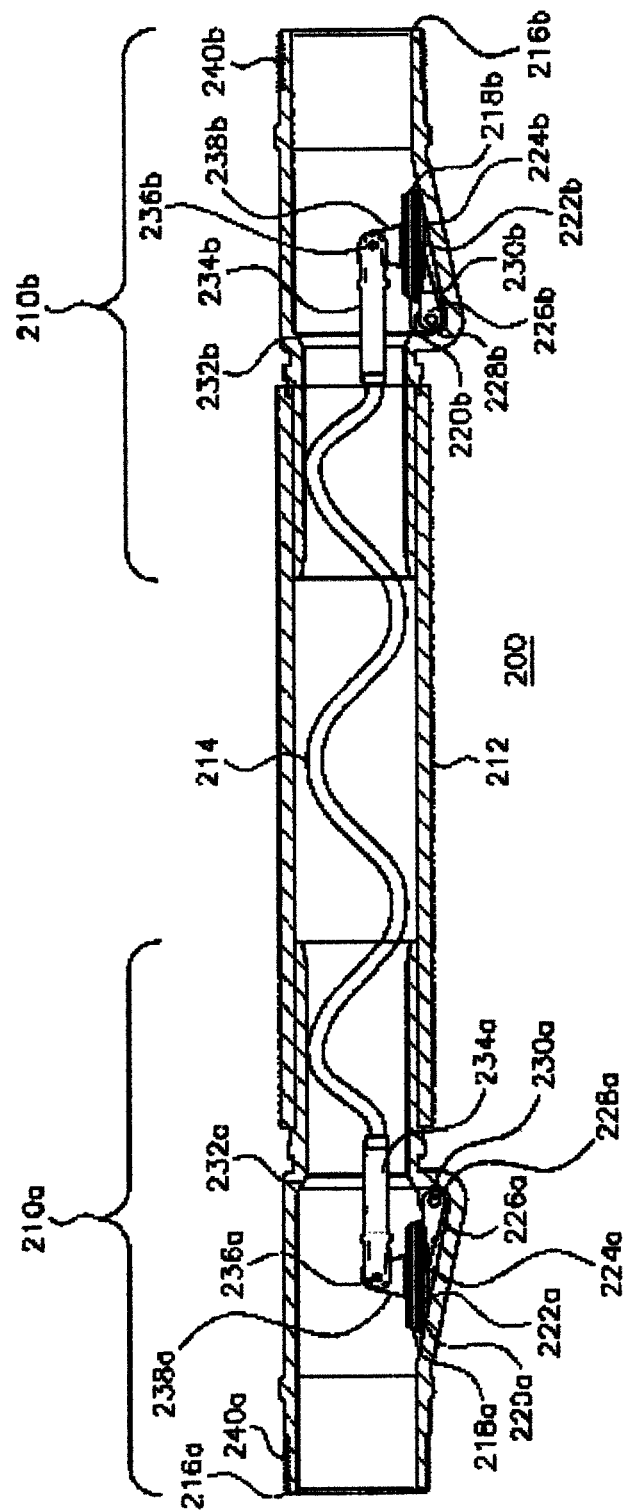
FIG. 19 is a cut away view of an additional embodiment of a fluid/gas conduit safety system with the valves open, allowing full gas/fluid flow in accordance with the present invention.
Figure 20:
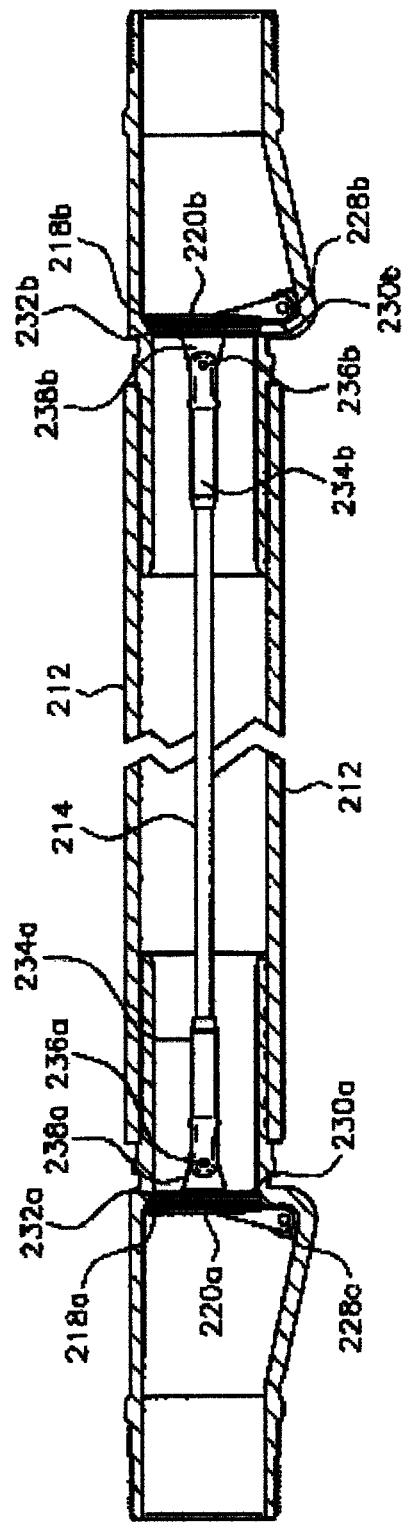
FIG. 20 is a cut away view of an additional embodiment of a fluid/gas conduit safety system with the valves closed, allowing no gas/fluid flow, because of a break in the conduit in accordance with the present invention.

There is shown in FIG. 19, a complete fluid/gas conduit safety system 200 with the valves in an open or fluid flow condition. Fluid/gas conduit safety system 200 includes a hose 212 attached to a pair of connector ends 210a and 210b with an internal cable 214 attached to connectors 234a and 234b respectively. In FIGS. 19 and 20, the letters "a" and "b" are used to differentiate between the two end fitting assemblies that are located at either end of hose 212. Each of these connector ends 210 has identical components.

Fluid/gas conduit safety system 200 is shown with a flexible internal cable 214 in serpentine state. Internal cable 214 has sufficient force to maintain valve 218a and 218b in their opened conditions to allow fluid flow therethrough. Upon a failure condition such a stretching or rupture, internal cable 214 no longer maintains valve 218a and 218b in the open condition. This may arise from pulling, the valves into a closed position or allowing the valves to close by virtue of the pressure exerted from the respective sides by removing the spring force of internal cable 214 that is holding valves 218a and 218b in place. Removing the spring force can occur through a rupture in hose 212 or a severing of cable 214. In an exemplary embodiment, internal cable 214 is a valve control means for maintaining the valves in the open position. Other embodiments, such as the pressurized tube described above can be used as the valve control means for maintaining the valves in an open position during normal (non-failure) operation.

FIG. 20 shows an example of a broken hose condition with valves 218a and 218b in the seated or seated (sealed) position. In the example shown in FIG. 20, cable 214 has become taut because of a severing of hose 212, pulling valves 218a and 218b into the seated position.

Additional embodiments of safety conduit systems may be derived from combining the features and embodiments described herein to address particular applications and conditions, all of which will benefit from replacing of at least one end housing with a separable coupling of the invention, as described below in Example 2.

Example 2

A Separable Coupling for an End Housing of a Fluid Conduit System

Figure 21A:
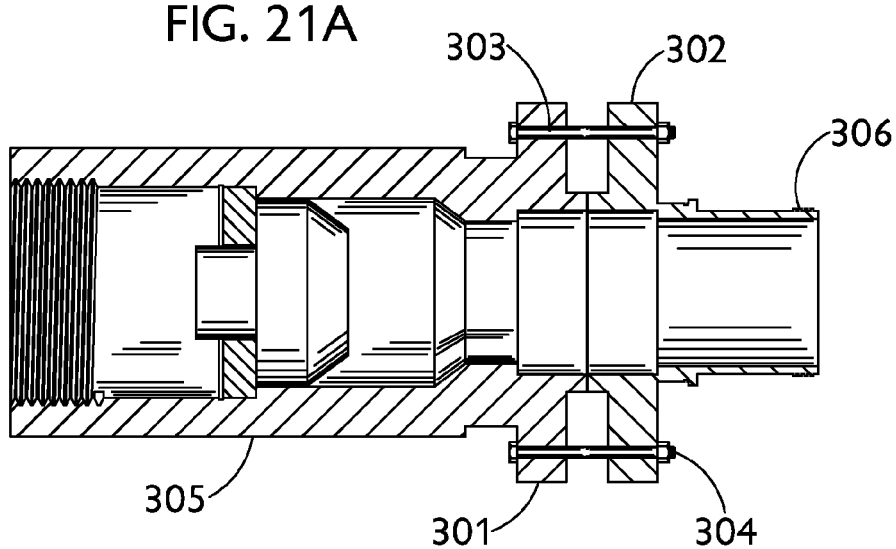
FIG. 21A is a cutaway view of a separable coupling of the present invention.
Figure 21B:
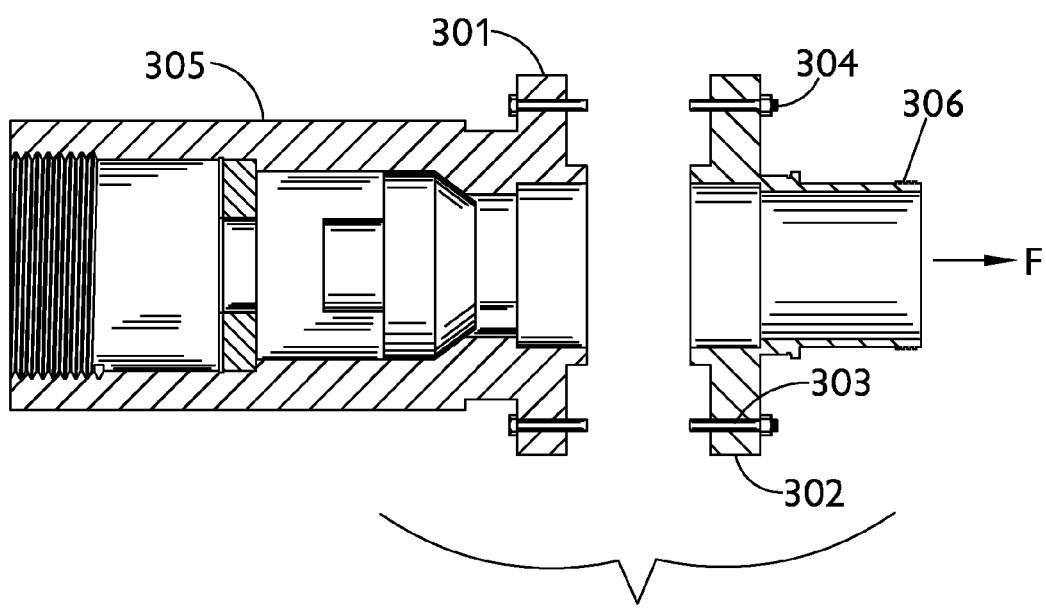
FIG. 21B is a cutaway view of a separable coupling of the present invention after separation.

With reference to FIGS. 21A and 21B, a separable coupling is provided having proximal [301] and distal [302] sides made of steel. The proximal side is a torus shape with its central hole providing the path of flow of fluid. The proximal side has four breakaway bolt holes [303] positioned around the central hole through which breakaway bolts [304] are inserted when mating the two sides together. Four additional weight reduction holes [not shown] are present to reduce the weight of the proximal side without compromising its structural strength and rigidity.

The proximal side [301] is provided with a longitudinally extended means [305] concentric with the central hole, and having a plurality of ridges suitable for clamping, crimping, or otherwise affixing a flexible conduit.

The separable coupling's distal side [302] mates with the proximal side through four breakaway bolt holes [303] aligned with those on the proximal side, such that the breakaway bolts [304] pass through the breakaway bolt holes on both the proximal and distal sides and thereby retain the two sides together. The distal side also has a central hole for fluid flow, the four breakaway bolt holes, and four additional holes for weight reduction. The distal side also is provided with a longitudinal manifold extension [306] concentric with the central hole, for attachment to a receptacle receiving, fluid during operation of the fluid conduit system.

The longitudinal manifold extension of the distal side [306] is also provided internally with one end of the fluid conduit valve safety system described below in Example 1.

The proximal and distal toroids are joined with breakaway bolts [304], which are carriage bolts with hexagonal heads threaded on their other ends to receive nuts. The breakaway bolts of this example are made of stainless steel, though they may alternatively be constructed from any sufficiently sturdy material, including plastic, aluminum, and the like. The nuts have been tightened to retain the two sides together. The system may also be equipped with a leash system of the invention, wherein the proximal and distal sides of the separable coupling, may be joined together by a flexible six inch cable leash whose attachment to both sides of the separable coupling is stronger than the plurality of breakaway bolts. The distal connection of the leash may alternatively be attached to the manifold itself Under a stress condition which breaks the breakaway bolts, thereby separating the separable coupling, the two sides of the now-separated coupling are not free to whip around because they are tethered together by the leash.

The separable coupling thus described may be used as one or both end housings of the fluid conduit system of Example 1, or may be employed in other fluid conduit systems as desired. Where employed at both ends, such a complete conduit system enjoys the advantages of breakaway safety at both ends, and safety valves at both ends, providing a conduit system which fails upon a stress condition in a desirable location, that is, at the separable coupling, prevents uncontrolled whipping of ruptured ends, and halts the flow of potentially hazardous substances before such substances can spill to a substantial degree.

Example 3

A Heat Dissipation Fitting for an End Housing of a Fluid Conduit System

Figure 22A:
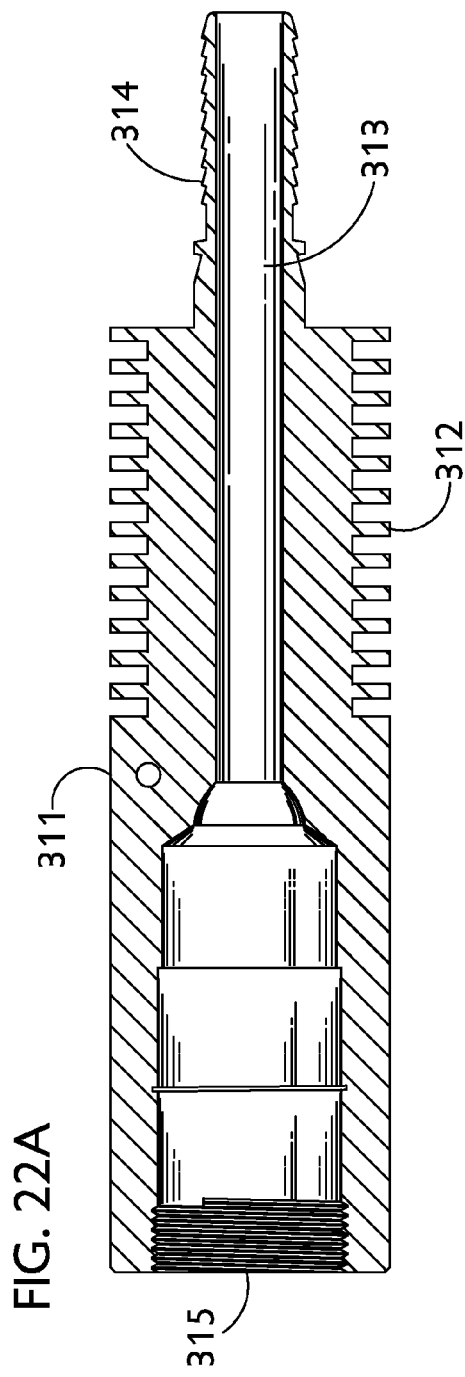
FIG. 22A is a cutaway view of a non-separable coupling provided with the heat dissipation system of the present invention.
Figure 22C:
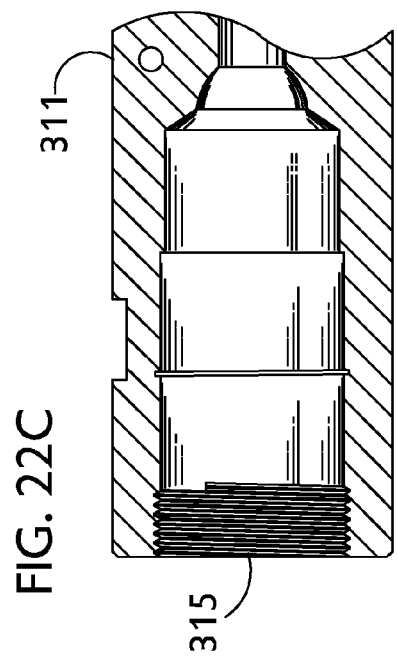
FIG. 22C is a cutaway view of a portion of the FIG. 22A non-separable coupling taken at a different angle from the angle of FIG. 22A.
Figure 22B:
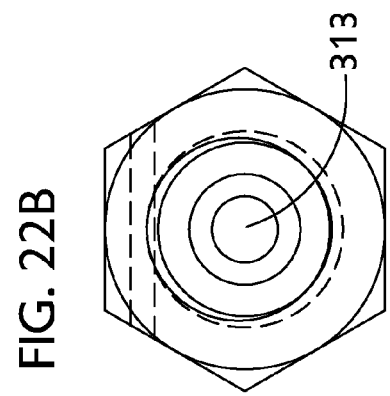
FIG. 22B is an end view of the FIG. 22A non-separable coupling.

As shown in FIGS. 22A-22C, a heat dissipation fitting [311] was constructed from brass and comprises twelve fins [312] (2 shown) spaced 3 mm around a central cavity [313] in the fitting through which fluid flows. The heat dissipation fitting has two longitudinal ends, one of which is extended [314] with ten ridges for securing a fluid conduit by crimping, clamping, or the like. The opposite end [315] is suitable for connection to a manifold to which the fluid flow is directed.

The heat dissipation fitting thus constructed may be used with any gas conduits known in the art, or in conjunction with a separable coupling described above to provide the advantages of both heat dissipation and separable coupling.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

All references cited in this application are hereby incorporated as if fully set forth herein. Those of skill in the art will appreciate the wide variety of applications for the above-described aspects and embodiments of the invention. The foregoing embodiments are therefore to be considered as illustrative only, the full scope of the invention being defined by the appended claims.

I claim:

1. A fluid coupling adapted for connection between a fluid source and a fluid destination, said fluid coupling comprising:
    a fluid conduit having:
        (a) a first end having a plurality of through holes, and
        (b) a second end;
    a first housing adapted for connection to a fluid source and having:
        (a) a first fluid opening through which fluid from the fluid source enters said first housing,
        (b) a second fluid opening through which fluid from the fluid source leaves said first housing and enters said fluid conduit,
        (c) a cavity between said first fluid opening in said first housing and said second fluid opening in said first housing, and
        (d) an end having a plurality of through holes aligned with said through holes in said first end of said conduit;
    a second housing adapted for connection to a fluid destination and having:
        (a) a first fluid opening through which:
            (1) fluid from the fluid source leaves said fluid conduit and enters said second housing, and
            (2) fluid from the fluid destination tends to leave said second housing and enter said fluid conduit during a failure of said fluid conduit unit,
        (b) a second fluid opening through which:
            (1) fluid from the fluid source leaves said second housing and enters the fluid destination, and
            (2) fluid from the fluid destination tends to enter said fluid conduit during a failure of said hose unit, and
        (c) a cavity between said first fluid opening in said second housing and said second fluid opening in said second housing;
    a coupling connecting said first housing to said first end of said fluid conduit and including a plurality of breakable bolts extending through and secured in said aligned through holes in said end of said first housing and said through holes in said first end of said fluid conduit that break when a predetermined force is applied to said breakable bolts that causes parts of said breakable bolts to separate;
    a first valve seat at said second fluid opening in said first housing;
    a second valve seat at said first fluid opening in said second housing;
    a first valve body in said cavity of said first housing and movable between;
        (a) a first position spaced from said first valve seat to permit flow of the fluid from the fluid source through said first housing, and
        (b) a second position against said first valve seat to prevent fluid leaving said first housing;
    a second valve body in said cavity of said second housing and movable between:
        (a) a first position spaced from said second valve seat to permit flow of the fluid from the fluid source through said second housing, and
        (b) a second position against said second valve seat to prevent fluid from the fluid destination leaving said second housing; and
    valve control means for:
        (a) retaining said first valve body in its first position and said second valve body in its first position, and
        (b) selectively urging said first valve body to its second position and said second valve body to its second position in response to breakage of said coupling and separation of said parts of said coupling.

2. A fluid coupling according to claim 1 wherein:
    (a) said first valve body is mounted in said first housing to move axially of said first housing from its first position to its second position, and
    (b) said second valve body is mounted in said second housing to move axially of said second housing from its first position to its second position.

3. A fluid coupling according to claim 1 wherein:

(a) said first valve body is mounted in said first housing to move pivotally in said first housing from its first position to its second position, and
(b) said second valve body is mounted in said second housing to move pivotally in said second housing from its first position to its second position.

4. A fluid coupling adapted for connection between a fluid source and a fluid destination, said fluid coupling comprising:
a fluid conduit having:
(a) a first end having a plurality of through holes, and a second end;
a first housing adapted for connection to a fluid source and having:
(a) a first fluid opening through which fluid from the fluid source enters said first housing,
(b) a second fluid opening through which fluid from the fluid source leaves said first housing and enters said fluid conduit.
(c) a cavity between said first fluid opening in said first housing and said second fluid opening in said first housing, and
(d) an end having plurality of through holes aligned with said through holes in said first end of said fluid conduit;
a second housing adapted for connection to a fluid destination and having:
(a) a first fluid opening through which:
(1) fluid from the fluid source leaves said fluid conduit and enters said second housing, and
(2) fluid from the fluid destination tends to leave said second housing and enter said fluid conduit during a failure of said fluid conduit unit,
(b) a second fluid opening through which:
(1) fluid from the fluid source leaves said second housing and enters the fluid destination, and
(2) fluid from the fluid destination tends to enter said fluid conduit during a failure of said hose unit, and
(c) a cavity between said first fluid opening in said second housing and said second fluid opening in said second housing;
a coupling connecting said first housing to said first end of said fluid conduit and including plurality of breakable bolts extending through and secured in said aligned through holes in said end of said first housing and said through holes in said first end of said fluid conduit that break when a predetermined force is applied to said breakable bolts that causes parts of said breakable bolts to separate;
a first valve seat at said second fluid opening in said first housing;
a second valve seat at said first fluid opening in said second housing;
a first valve body in said cavity of said first housing and movable between:
(a) a first position spaced from said first valve seat to permit flow of the fluid from the fluid source through said first housing, and
(b) a second position against said first valve seat to prevent fluid leaving said first housing;
a second valve body in said cavity of said second housing and movable between:
(a) a first position spaced from said second valve seat to permit flow of the fluid from the fluid source through said second housing, and
(b) a second position against said second valve seat to prevent fluid from the fluid destination leaving said second housing; and
valve control means for:

(a) retaining said first valve body in its first position and said second valve body in its first position, and
(b) selectively urging said first valve body to its second position and said second valve body to its second position in response to breakage of said coupling and separation of said parts of said coupling.

5. A fluid conducting unit having a safety system, said fluid conducting unit comprising:
a hose having:
(a) a first end having a plurality of through holes, and
(b) a second end;
a first housing connected to said first end of said hose and having:
(a) a first opening,
(b) a second opening,
(c) an internal cavity between said first opening in said first housing and said second opening in said first housing, and
(d) an end having a plurality of through holes aligned with said through holes in said first end of said hose;
a second housing connected to said second end of said hose and having:
(a) a first opening,
(b) a second opening, and
(c) an internal cavity between said first opening in said second housing and said second opening in said second housing;
a coupling connecting said first housing to said first end of said hose and including a plurality of breakable bolts extending through and secured in said aligned through holes in said end of said first housing and said through holes in said first end of said hose that break when a predetermined force is applied to said breakable bolts that causes parts of said breakable bolts to separate;
a first valve having:
(a) a first valve seat disposed in said second opening in said first housing, and
(b) a first valve body mounted to said first housing and movable between a first position spaced from said first valve seat and a second position against said first valve seat;
a second valve having:
(a) a second valve seat disposed in said first opening in said second housing, and
(b) a second valve body mounted to said second housing and movable between a first position spaced from said second valve seat and a second position against said second valve seat; and
valve control means for:
(a) retaining said first valve body in said first position of said first valve body during an open flow condition of said fluid conducting unit,
(b) retaining said second valve body in said first position of said second valve body during an open flow condition of said fluid conducting unit,
(c) seating said first valve body in said first valve seat upon breakage of said coupling, and
(d) seating said second valve body in said second valve seat upon breakage of said coupling.

6. A fluid conducting unit having a safety according to claim to claim 5 wherein:
(a) said first valve body is mounted in said first housing to move axially of said first housing from its first position to its second position, and
(b) said second valve body is mounted in said second housing to move axially of said second housing from its first position to its second position.

7. A fluid conducting unit having a safety system according to claim 5 wherein:
(a) said first valve body is mounted in said first housing to move pivotally in said first housing from its first position to its second position, and
(b) said second valve body is mounted in said second housing to move pivotally in said second housing from its first position to its second position.

8. A fluid conducting unit having a safety system according to claim 7 wherein:
(a) said internal cavity between said first opening in said first housing and said second opening in said first housing has a recess for retaining said first valve body substantially out of fluid flow through said fluid conducting unit during an open flow condition, and
(b) said internal cavity between said first opening in said second housing and said second opening in said second housing has a recess for retaining said second valve body substantially out of fluid flow through said fluid conducting unit during an open flow condition.

9. A fluid conducting unit having a safety system, said fluid conducting unit comprising:
a hose having:
(a) a plurality of through holes at a first end, and
(b) a second end;
a first housing connected to said first end of said hose and having:
(a) a first opening,
(b) a second opening,
(c) an internal cavity between said first opening in said first housing and said second opening in said first housing, and
a plurality of through holes extending through an end of said first housing aligned with said through holes in said end of said hose;
a second housing connected to said second end of said hose and having:
(a) a first opening,
(b) a second opening, and
(c) an internal cavity between said first opening in said second housing and said second opening in said second housing;
a coupling connecting said first housing to said first end of said hose and including a plurality of breakable bolts extending through and secured in said aligned through holes in said end of said first housing and said through holes in said first end of said hose that break when a predetermined force is applied to said breakable bolts that causes parts of said breakable bolts to separate;
a first valve having:
(a) a first valve seat disposed in said second opening in said first housing, and
(b) a first valve body mounted to said first housing and movable between a first position spaced from said first valve seat and a second position against said first valve seat;
a second valve having:
(a) a second valve seat disposed in said first opening in said second housing, and
(b) a second valve body mounted to said second housing and movable between a first position spaced from said second valve seat and a second position against said second valve seat; and
valve control means for:
(a) retaining said first valve body in said first position of said first valve body during an open flow condition of said fluid conducting unit,
(b) retaining said second valve body in said first position of said second valve body during an open flow condition of said fluid conducting unit,
(c) seating said first valve body in said first valve seat upon breakage of said coupling, and
(d) seating said second valve body in said second valve seat upon breakage of said coupling.

10. A fluid conducting unit having a safety system, said fluid conducting unit comprising:
a hose having a first end and a second end;
a first housing connected to said first end of said hose and having:
(a) a first opening,
(b) a second opening, and
(c) an internal cavity between said first opening in said first housing and said second opening in said first housing;
a second housing connected to said second end of said hose and having:
(a) a first opening,
(b) a second opening, and
(c) an internal cavity between said first opening in said second housing and said second opening in said second housing;
a coupling:
(a) connecting at least one of:
(1) said first housing to said first end of said hose, and
(2) said second housing to said second end of said hose, and
(b) breakable when a predetermined force is applied to said coupling that causes parts of said coupling to separate;
a first valve having:
(a) a first valve seat disposed in said second opening in said first housing, and
(b) a first valve body mounted to said first housing and movable between a first position spaced from said first valve seat and a second position against said first valve seat;
a second valve having:
(a) a second valve seat disposed in said first opening in said second housing and spaced apart from said first valve seat by a first distance, and
(b) a second valve body mounted to said second housing and movable between a first position spaced from said second valve seat and a second position against said second valve seat, said second valve body spaced apart from said first valve body by a second distance greater that the first distance by which and said first valve seat and said second valve seat are spaced apart;
valve control means including a flexible, yet substantially rigid, cable positioned within said hose and having a length greater than the length of said hose and a substantially serpentine shape, with a first cable end connected to said first valve body and a second cable end connected to said second valve body for:
(a) retaining said first valve body in said first position of said first valve body during an open flow condition of said fluid conducting unit
(b) retaining said second valve body in said first position of said second valve body during an open flow condition of said fluid conducting unit,
(c) seating said first valve body in said first valve seat upon breakage of said coupling, and
(d) seating said second valve body in said second valve seat upon breakage of said coupling.

11. A fluid conducting unit having a safety system according to claim 10 wherein:

(a) said first valve body is mounted in said first housing to move axially of said first housing from its first position to its second position, and
(b) said second valve body is mounted in said second housing to move axially of said second housing from its first position to its second position.

12. A fluid conducting unit having a safety system according to claim 10 wherein:
(a) said first valve body is mounted in said first housing to move pivotally in said first housing from its first position to its second position, and
(b) said second valve body is mounted in said second housing to move pivotally in said second housing from its first position to its second position.

13. A fluid conducting unit having a safety system according to claim 10 wherein:
(a) said first housing has an end having a plurality of through holes,
(b) said first end of said hose has a plurality of through holes aligned with said through holes in said end of said first housing, and
(c) said coupling includes a plurality of breakable bolts extending through and secured in said aligned through holes in said first housing and said through holes in said first end of said hose that break when a predetermined force is applied to said breakable bolts that causes parts of said breakable bolts to separate.

14. A fluid conducting unit having a safety system according to claim 10 wherein said coupling includes:
(a) a plurality of through holes extending through an end said first housing,
(b) a plurality of through holes extending through said first end of said hose and aligned with said through holes in said end of said first housing, and
(c) a plurality of breakable bolts extending through and secured in said aligned through holes in said first housing and said through holes in said first end of said hose that break when a predetermined force is applied to said breakable bolts that causes parts of said breakable bolts to separate.

15. A fluid conducting unit having a safety system, said fluid conducting unit comprising:
a hose having a first end and a second end;
a first housing connected to said first end of said hose and having:
(a) a first opening,
(b) a second opening, and
(c) an internal cavity between said first opening in said first housing and said second opening in said first housing;
a second housing connected to said second end of said hose and having:
(a) a first opening,
(b) a second opening, and
(c) an internal cavity between said first opening in said second housing and said second opening in said second housing;
a coupling:
(a) connecting at least one of:
(1) said first housing to said first end of said hose, and
(2) said second housing to said second end of said hose, and
(b) breakable when a predetermined force is applied to said coupling that causes parts of said coupling to separate;
a first valve having:
(a) a first valve seat disposed in said second opening in said first housing, and
(b) a first valve body mounted to said first housing and movable between a first position spaced from said first valve seat and a second position against said first valve seat;
a second valve having:
(a) a second valve seat disposed in said first opening in said second housing, and
(b) a second valve body mounted to said second housing and movable between a first position spaced from said second valve seat and a second position against said second valve seat; and
valve control means, including a pressurized tube attached to said first and second valve bodies and having a length substantially the same as the length of said hose, for:
(a) retaining said first valve body in said first position of said first valve body during an open flow condition of said fluid conducting unit,
(b) retaining said second valve body in said first position of said second valve body during an open flow condition of said fluid conducting unit,
(c) seating said first valve body in said first valve seat upon breakage of said coupling, and
(d) seating said second valve body in said second valve seat upon breakage of said coupling.

16. A fluid coupling adapted for connection between a fluid source and a fluid destination, said fluid coupling comprising:
a fluid conduit having:
(a) a first end, and
(b) a second end having a plurality of through holes;
a first housing adapted for connection to a fluid source and having:
(a) a first fluid opening through which fluid from the fluid source enters said first housing,
(b) a second fluid opening through which fluid from the fluid source leaves said first housing and enters said fluid conduit, and
(c) a cavity between said first fluid opening in said first housing and said second fluid opening in said first housing;
a second housing adapted for connection to a fluid destination and having:
(a) a first fluid opening through which:
(1) fluid from the fluid source leaves said fluid conduit and enters said second housing, and
(2) fluid from the fluid destination tends to leave said second housing and enter said fluid conduit during a failure of said fluid conduit unit,
(b) a second fluid opening through which:
(1) fluid from the fluid source leaves said second housing and enters the fluid destination, and
(2) fluid from the fluid destination tends to enter said fluid conduit during a failure of said hose unit,
(c) a cavity between said first fluid opening in said second housing and said second fluid opening in said second housing, and
(d) an end having a plurality of through holes aligned with said through holes in said second end of said conduit;
a coupling connecting said second housing to said second end of said fluid conduit and including a plurality of breakable bolts extending through and secured in said aligned through holes in said end of said second housing and said through holes in said second end of said fluid conduit that break when a predetermined force is applied to said breakable bolts that causes parts of said breakable bolts to separate;
a first valve seat at said second fluid opening in said first housing;

a second valve seat at said first fluid opening in said second housing;
a first valve body in said cavity of said first housing and movable between:
(a) a first position spaced from said first valve seat to permit flow of the fluid from the fluid source through said first housing, and
(b) a second position against said first valve seat to prevent fluid leaving said first housing;
a second valve body in said cavity of said second housing and movable between:
(a) a first position spaced from said second valve seat to permit flow of the fluid from the fluid source through said second housing, and
(b) a second position against said second valve seat to prevent fluid from the fluid destination leaving said second housing; and
valve control means for:
(a) retaining said first valve body in its first position and said second valve body in its first position, and
(b) selectively urging said first valve body to its second position and said second valve body to its second position in response to breakage of said coupling and separation of said parts of said coupling.

17. A fluid coupling adapted for connection between a fluid source and a fluid destination, said fluid coupling comprising:
a fluid conduit having:
(a) a first end, and
(b) a second end having a plurality of through holes;
a first housing adapted for connection to a fluid source and having:
(a) a first fluid opening through which fluid from the fluid source enters said first housing,
(b) a second fluid opening through which fluid from the fluid source leaves said first housing and enters said fluid conduit, and
(c) a cavity between said first fluid opening in said first housing and said second fluid opening in said first housing, and
a second housing adapted for connection to a fluid destination and having:
(a) a first fluid opening through which:
(1) fluid from the fluid source leaves said fluid conduit and enters said second housing, and
(2) fluid from the fluid destination tends to leave said second housing and enter said fluid conduit during a failure f said fluid conduit unit,
(b) a second fluid opening through which:
(1) fluid from the fluid source leaves said second housing and enters the uid destination, and
(2) fluid from the fluid destination tends to enter said fluid conduit during a failure of said hose unit, and
(c) a cavity between said first fluid opening in said second housing and said second fluid opening in said second housing, and,
(d) an end having plurality of through holes aligned with said through holes in said second end of said fluid conduit;
a coupling connecting said second housing to said second end of said fluid conduit and including plurality of breakable bolts extending through and secured in said aligned through holes in said end of said second housing and said through holes in said second end of said fluid conduit that break when a predetermined force is applied to said breakable bolts that causes parts of said breakable bolts to separate;
a first valve seat at said second fluid opening in said first housing;
a second valve seat at said first fluid opening in said second housing;
a first valve body in said cavity of said first housing and movable between:
(a) a first position spaced from said first valve seat to permit flow of the fluid from the fluid source through said first housing, and
(b) a second position against said first valve seat to prevent fluid leaving said first housing;
a second valve body in said cavity of said second housing and movable between:
(a) a first position spaced from said second valve seat to permit flow of the fluid from the fluid source through said second housing, and
(b) a second position against said second valve seat to prevent fluid from the fluid destination leaving said second housing; and
valve control means for:
(a) retaining said first valve body in its first position and said second valve body in its first position, and
(b) selectively urging said first valve body to its second position and said second valve body to its second position in response to breakage of said coupling and separation of said parts of said coupling.

18. A fluid conducting unit having a safety system, said fluid conducting unit comprising:
a hose having:
a) a first end, and
(b) a second end having a plurality of through holes;
a first housing connected to said first end of said hose and having:
(a) a first opening,
(b) a second opening, and
(c) an internal cavity between said first opening in said first housing and said second opening in said first housing;
a second housing connected to said second end of said hose and having:
(a) a first opening,
(b) a second opening,
(c) an internal cavity between said first opening in said second housing and said second opening in said second housing, and
(d) an end having a plurality of through holes aligned with said through holes in said second end of said hose;
a coupling connecting said second housing to said second end of said hose and including a plurality of breakable bolts extending through and secured in said aligned through holes in said end of said second housing and said through holes in said second end of said hose that break when a predetermined force is applied to said breakable bolts that causes parts of said breakable bolts to separate;
a first valve having:
(a) a first valve seat disposed in said second opening in said first housing, and
(b) a first valve body mounted to said first housing and movable between a first position spaced from said first valve seat and a second position against said first valve seat;
a second valve having:
(a) a second valve seat disposed in said first opening in said second housing, and
(b) a second valve body mounted to said second housing and movable between a first position spaced from said second valve seat and a second position against said second valve seat; and valve control means for:
(a) retaining said first valve body in said first position of said first valve body during an open flow condition of said fluid conducting unit,
(b) retaining said second valve body in said first position of said second valve body during an open flow condition of said fluid conducting unit,
(c) seating said first valve body in said first valve seat upon breakage of said coupling, and
(d) seating said second valve body in said second valve seat upon breakage of said coupling.

19. A fluid conducting unit having a. safety system, said fluid conducting unit comprising:
a hose having:
(a) a first end, and
(b) a plurality of through holes at a second end;
a first housing connected to said first end of said hose and having:
(a) a first opening,
(b) a second opening, and
(c) an internal cavity between said first opening in said first housing and said second opening in said first housing;
a second housing connected to said second end of said hose and having:
(a) first opening,
(b) a second opening,
(c) an internal cavity between said first opening in said second housing and said second opening in said second housing, and and
(d) a plurality of through holes extending through an end of said second housing aligned with said through holes in said second end of said hose;
a coupling connecting said second housing to said second end of said hose and including a plurality of breakable bolts extending through and secured in said aligned through holes in said end of said second housing and said through holes in said second end of said hose that break when a predetermined force is applied to said breakable bolts that causes parts of said breakable bolts to separate;
a first valve having:
(a) a first valve seat disposed in said second opening in said first housing, and
(b) a first valve body mounted to said first housing and movable between a first position spaced from said first valve seat and a second position against said first valve seat;
a second valve having:
(a) a second valve seat disposed in said first opening in said second housing, and
(b) a second valve body mounted to said second housing and movable between a first position spaced from said second valve seat and a second position against said second valve seat; and
valve control means for:
(a) retaining said first valve body in said first position of said first valve body during an open flow condition of said fluid conducting unit,
(b) retaining said second valve body in said first position of said second valve body during an open flow condition of said fluid conducting unit,
(c) seating said first valve body in said first valve seat upon breakage of said coupling, and
(d) seating said second valve body in said second valve seat upon breakage of said coupling.

20. A fluid conducting unit having a safety system, said fluid conducting unit comprising:
a hose having a first end and a second end;
a first housing connected to said first end of said hose and having:
(a) a first opening,
(b) a second opening, and
(c) an internal cavity between said first opening in said first housing and said second opening in said first housing;
a second housing connected to said second end of said hose and having:
(a) a first opening,
(b) a second opening, and
(c) an internal cavity between said first opening in said second housing and said second opening in said second housing;
a coupling:
(a) connecting at least one of:
(1) said first housing to said first end of said hose, and
(2) said second housing to said second end of said hose, and
(b) breakable when a predetermined force is applied to said coupling that causes parts of said coupling to separate;
a first valve having:
(a) a first valve seat disposed in said second opening in said first housing, and
(b) a first valve body mounted to said first housing and movable between
(1) a first position spaced from said first valve seat, and
(2) a second position against said first valve seat;
a second valve having:
(a) a second valve seat disposed in said first opening in said second housing and spaced apart from said first valve seat by a first distance,
(b) a second valve body mounted to said second housing and movable between:
(1) a first position spaced from said second valve seat, and
(2) a second position against said second valve seat, with that surface of said second valve body that is against said second valve seat when said second valve body is in its second position and that surface of said first valve body that is against said first valve seat when said first valve body is against said first valve seat being spaced apart, when said first valve body is in its first position and said second valve body is in its first position, by a second distance greater than the first distance by which said first valve seat and said second valve seat are spaced apart; and valve control means:
(a) including a flexible, yet substantially rigid cable having a first cable end connected to said first valve body and a second cable end connected to said second valve body, and
(b) for:
(1) retaining said first valve body in said first position of said first valve body during an open flow condition of said fluid conducting unit,
(2) retaining said second valve body in said first position of said second valve body during an open flow condition of said fluid conducting unit,
(3) seating said first valve body in said first valve seat upon breakage of said coupling, and
(4) seating said second valve body in said second valve seat upon breakage of said coupling.

21. A fluid conducting unit having a safety system according to claim 20 wherein said cable is positioned within said hose and has a substantially serpentine shape.

* * * * *

UNITED STATES PATENT AND TRADEMARK OFFICE
CERTIFICATE OF CORRECTION

PATENT NO. : 8,800,586 B2
APPLICATION NO. : 12/560758
DATED : August 12, 2014
INVENTOR(S) : Joseph H. Abrams Page 1 of 1

It is certified that error appears in the above-identified patent and that said Letters Patent is hereby corrected as shown below:

In the Claims

Column 20, line 22, "hose unit" should be changed to --fluid conduit--;

Column 21, line 36, "hose unit" should be changed to --fluid conduit--;

Column 24, line 58, after "unit" insert a --,--;

Column 27, line 48, "f" should be changed to --of-- and delete "unit";

Column 27, line 53, "hose unit" should be changed to --fluid conduit--;

Column 29, line 12, the "." after "having" should be removed;

Column 30, line 26, a --:-- should be inserted after "between";

Column 30, line 47, "valve control means:" should be a new paragraph.

Signed and Sealed this
Fourth Day of August, 2015

Michelle K. Lee
*Director of the United States Patent and Trademark Office*